(12) United States Patent
Lokitz

(10) Patent No.: US 7,401,025 B1
(45) Date of Patent: Jul. 15, 2008

(54) ACCESSIBLE SERVICE PROVIDER CLEARINGHOUSE

(76) Inventor: Elliott Lokitz, 1225 Park Ave., New York, NY (US) 10128

(*) Notice: Subject to any disclaimer, the term of this patent is extended or adjusted under 35 U.S.C. 154(b) by 0 days.

(21) Appl. No.: 09/503,912

(22) Filed: Feb. 15, 2000

(51) Int. Cl.
G06Q 10/00 (2006.01)
(52) U.S. Cl. .......................................................... 705/1
(58) Field of Classification Search .................... 705/1, 705/26–28, 4, 5, 7, 8, 9, 10, 11, 12, 14, 29, 705/35, 36, 37, 39, 40, 44, 500
See application file for complete search history.

(56) References Cited

U.S. PATENT DOCUMENTS

| | | | | |
|---|---|---|---|---|
| 4,992,940 A * | 2/1991 | Dworkin | ....................... | 705/26 |
| 5,652,842 A | 7/1997 | Siegrist, Jr. et al. | | |
| 5,724,508 A * | 3/1998 | Harple et al. | ................ | 709/205 |
| 5,799,284 A * | 8/1998 | Bourquin | ..................... | 705/26 |
| 5,862,223 A * | 1/1999 | Walker et al. | .................. | 705/50 |
| 5,893,118 A * | 4/1999 | Sonderegger | ................ | 707/203 |
| 5,940,807 A * | 8/1999 | Purcell | ......................... | 705/26 |
| 5,950,172 A * | 9/1999 | Klingman | ..................... | 705/26 |
| 6,028,866 A * | 2/2000 | Engel et al. | .................. | 370/461 |
| 6,076,072 A * | 6/2000 | Libman | ......................... | 705/34 |
| 6,081,789 A * | 6/2000 | Purcell | ......................... | 705/26 |
| 6,088,717 A * | 7/2000 | Reed et al. | ................... | 709/201 |
| 6,119,101 A * | 9/2000 | Peckover | ....................... | 705/10 |
| 6,151,588 A * | 11/2000 | Tozzoli et al. | ................. | 705/37 |
| 6,260,024 B1 * | 7/2001 | Shkedy | ......................... | 705/37 |
| 6,266,659 B1 | 7/2001 | Nadkarni | | |
| 6,301,574 B1 | 10/2001 | Thomas et al. | | |
| 6,321,221 B1 * | 11/2001 | Bieganski | ..................... | 705/10 |
| 6,330,551 B1 * | 12/2001 | Burchetta et al. | ............. | 705/80 |
| 6,782,370 B1 | 8/2004 | Stack | | |
| 6,856,963 B1 * | 2/2005 | Hurwitz | ....................... | 705/10 |
| 2004/0044563 A1 * | 3/2004 | Stein | ............................ | 705/10 |

FOREIGN PATENT DOCUMENTS

| | | | |
|---|---|---|---|
| EP | 0 866408 A2 | * | 9/1998 |
| JP | 09212560 | * | 8/1997 |
| JP | 2006277678 | * | 10/2006 |

OTHER PUBLICATIONS

Hess, Christopher M., Kemerer, Chris F., "Computerized loan origination systems: An industry case study of electronic markets hypothesis", MIS Quarterly v18n3 pp. 251-275, Sep. 1994, File 15.*

(Continued)

*Primary Examiner*—Igor N Borissov
(74) *Attorney, Agent, or Firm*—Nixon & Vanderhye PC

(57) ABSTRACT

A service that maintains a minimum criteria level for service providers to be listed and available for public access. It can list not only the service provider's credentials and insurance support (with monitored expiration dates), but may also provide a current up-to-date rating system by the users themselves, as to the satisfaction level of the quality and reliability of the work performed. It can also offer a double-check of the credentials by customer verification input. Furthermore, the example service can be easily accessible by the general public (for individual or business use) on the Internet, or by printed text directories sold direct or in bookstores.

90 Claims, 18 Drawing Sheets

OTHER PUBLICATIONS

ValueStar® Inc.; Internet Print out from Web.archive.org; pp. 1-17; 1998.*
Customersat.com; Internet Print out from Web.archive.org; 1998.*
BuyerZone.com web site information, 6 pages (1999).
ConsumerReports.org web site information, 17 pages (1999).
Martindale.com web site information, 6 pages (Dec. 20, 1999).
ePublicEye.com web site information, 12 pages, (Dec. 7, 1999).
Servicereports.com web site information, 3 pages (Dec. 14, 1999).
Xactware.com web site information, 4 pages (1998).
Slatalla, Michelle, "Delegating the Dirty Work of Cleaning Up," The New York Times, p. E4 (Feb. 17, 2000).
imandi.com web site information, 19 pages (1999-2000).
efrenzy.com web site information, 10 pages (1999).
handshake.com web site information, e-Standard Inc., 11 pages (1999-2000).
fundu.com web site information, Copyright 2000, 66 pages.
FUNDU.COM, USPTO trademark information, 2 pages, (Mar. 30, 1000).
ServiceLane.com (formerly fundu.com) web site information, 36 pages (2000).
Switchboard.com web site information, 8 pages (1996-2000).
News Release, "Contractor.Com Launches New Web Site, Offering Contractors Keys to Success Online," 3 pages (Nov. 5, 1999).
Contractor.com web site information, 28 pages.
CONTRACTOR.COM, USPTO trademark information, 2 pages (Nov. 29, 1999).
Bounds, Jeff, "fundu.com comes online to help you find home services," http://dallas,bcentral.com, *Dallas Business Journal* (Oct. 29, 1999).
"450,000 Consumer Surveys Completed", Valuestar.com/main web site information, (Copyright 1997).
"Search Results for Jan. 01, 1996-Sep. 14, 2005", Valuestar.com/consumer/alarmsys web site information (Copyright 2001).
"Letter from the Managing Director", by Jim Stein, Valuestar.com/letters web site information (Copyright 1997).
"The Consumer ValueStar Report", Valuestar.com/consumer/club web site information (Copyright 1997).
"Consumer Help Phone Numbers", Valuestar.com/consumer/phonelst web site information (Copyright 1997).
"Consumer Topics & Information", Valuestar.com/consumer/index web site information (Copyright 1998).
"Search Menu for Top Rated Companies", Valuestar.com/search1a web site information (1999).
"Earn ValueStar Certified", Valuestar.com/referral web site information (1999).
"Complaints with a Qualified Services Provider", Valuestar.com/consumer/complain web site information (Copyright 1997).
"How Companies are Rated", Valuestar.com/company/howrated web site information (Copyright 1997).
"ValueStar—Who We Are and What We Believe", Valuestar.com/mission web site information (1999).
"ValueStar Certified Most Asked Questions", Valuestar.com/company/faq web site information (Copyright 1997).
"To understand how the Public Research Institute (PRI) works, think of the area's many fine teaching hospitals", Valuestar.com/company/pri web site information (Copyright 1999).
"ValueStar Investor Information", Valuestar.com/investorinfo web site information (1998).
"ValueStar Corporation Corporate Profile for Dec. 1997", Valuestar.com/vsinfo/profweb1 web site information (Dec. 1997).
"ValueStar in the News", Valuestar.com/vsinfo/newsandpress web site information (1999).
"Business Owners", Valuestar.com/bizowner web site information (Copyright 1997).
Home Alarm Systems, Valuestar.com/consumer/alarmsys web site information (Copyright 1997).
"500,000 Customer Surveys Completed!", Valuestar.com/toprated web site information (Copyright 1999).
"ValueStar Enters Into Agreement With First National Bank of Omaha", Creditcardsmagazine.com web site information (Sep. 28, 2000).
"ValueStar Customer-Rated Program Launched", Creditcardsmagazine.com/ManageArticle web site information (May 17, 2001).
"Eat This Logo, Sucker", by Lisa Davis, sfweekly.com/Issues web site information (Mar. 31, 1999).
"ValueStar Closes on $2.45 Million in Financing", by Internetnews.com Staff, internetnews.com web site information (Apr. 5, 1999).
"ValueStar Launches Advertising Campaign", by Beth Cox, clickz.com web site information (May 27, 1999).
"ValueStar Corporation (OTC)—Significant Developments", bigeasyinvestor.marketguide.com web site information (Jul. 19, 1999).
"ValueStar: A kinder, gentler rating service?", by Peg Brickley, bizjournals.com/Philadelphia web site information (Sep. 6, 1999).
ValueStar Corp. Form 10KSB for period ending Jun. 30, 1999.
ValueStar Corp. Form 10QSB for period ending Sep. 30, 1999.
ValueStar Corp. Form 10QSB for period ending Dec. 31, 1999.
ValueStar Corp. Form 10QSB for period ending Mar. 31, 2000.
ValueStar Corp. Form 10QSB for period ending Sep. 30, 1998.
ValueStar Corp. Form 10QSB for period ending Dec. 31, 1998.
ValueStar Corp. Form 10KSB for period ending Jun. 30, 2000.
ValueStar Corp. Form 10KSB for period ending Jun. 30, 1998.
ValueStar Corp. Form 10QSB for period ending Mar. 31, 1999.
"ValueStar stops shining", bizjournals.com web site information (Oct. 15, 2001).
USPTO File History for U.S. Appl. No. 10/458,381, filed Jun. 11, 2003 (Stein).
USPTO File History for U.S. Appl. No. 09/487,963, filed Jan. 18, 2000 (Stein).
U.S. Appl. No. 09/702,045, filed Oct. 31, 2000 (Stein).

* cited by examiner

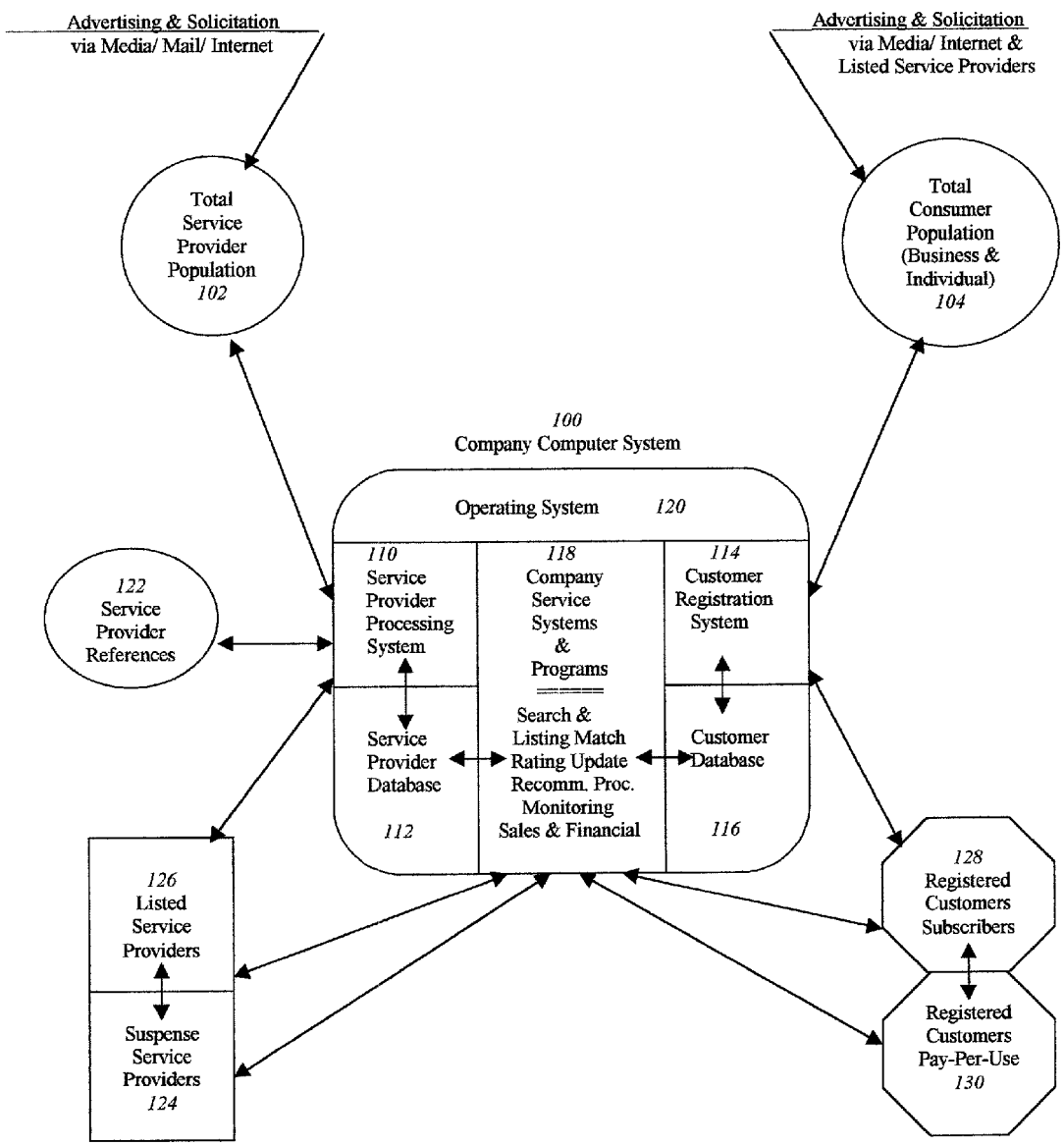
Figure 1 - Business Overview

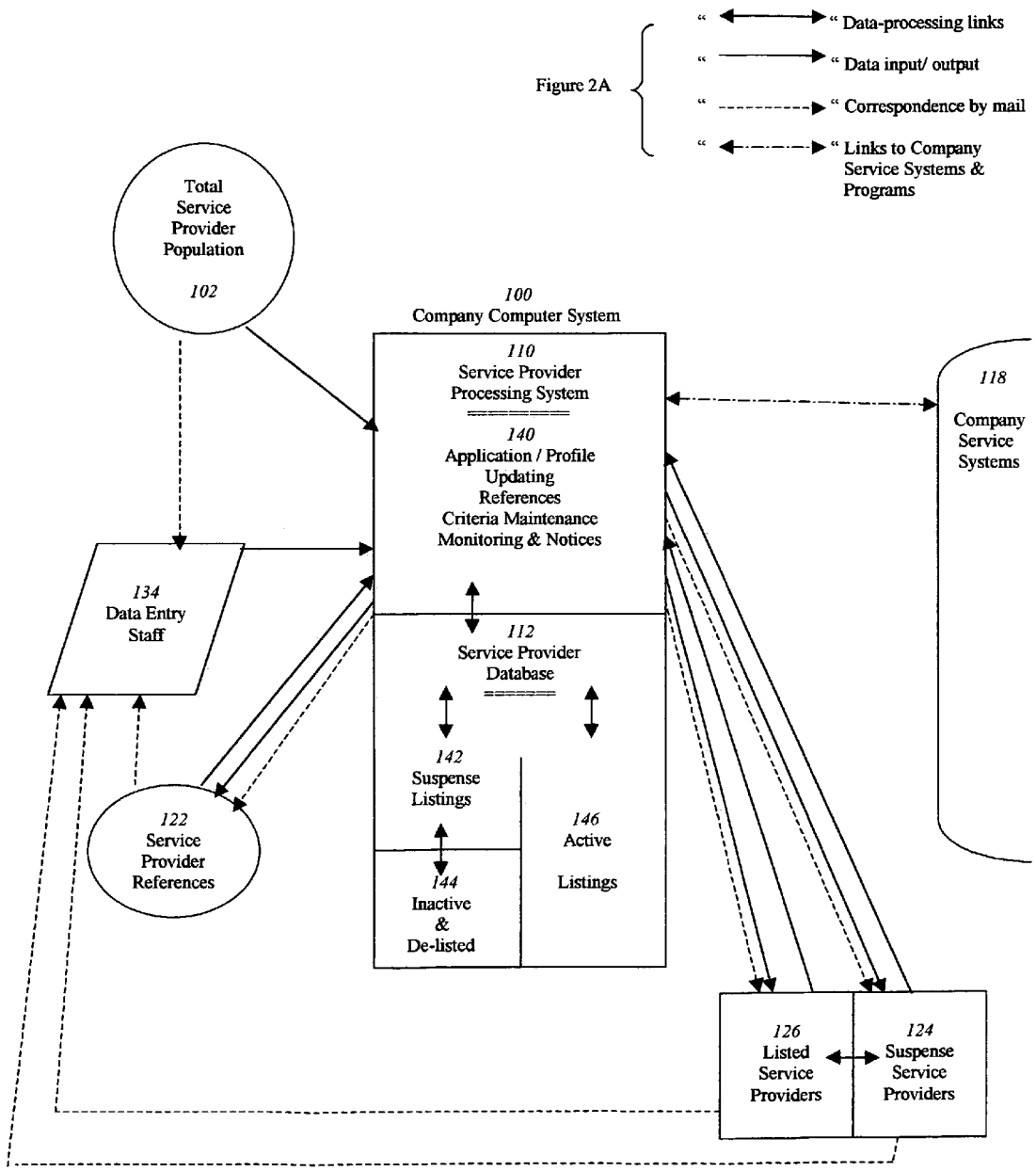
Figure 2 - Service Provider System Operation

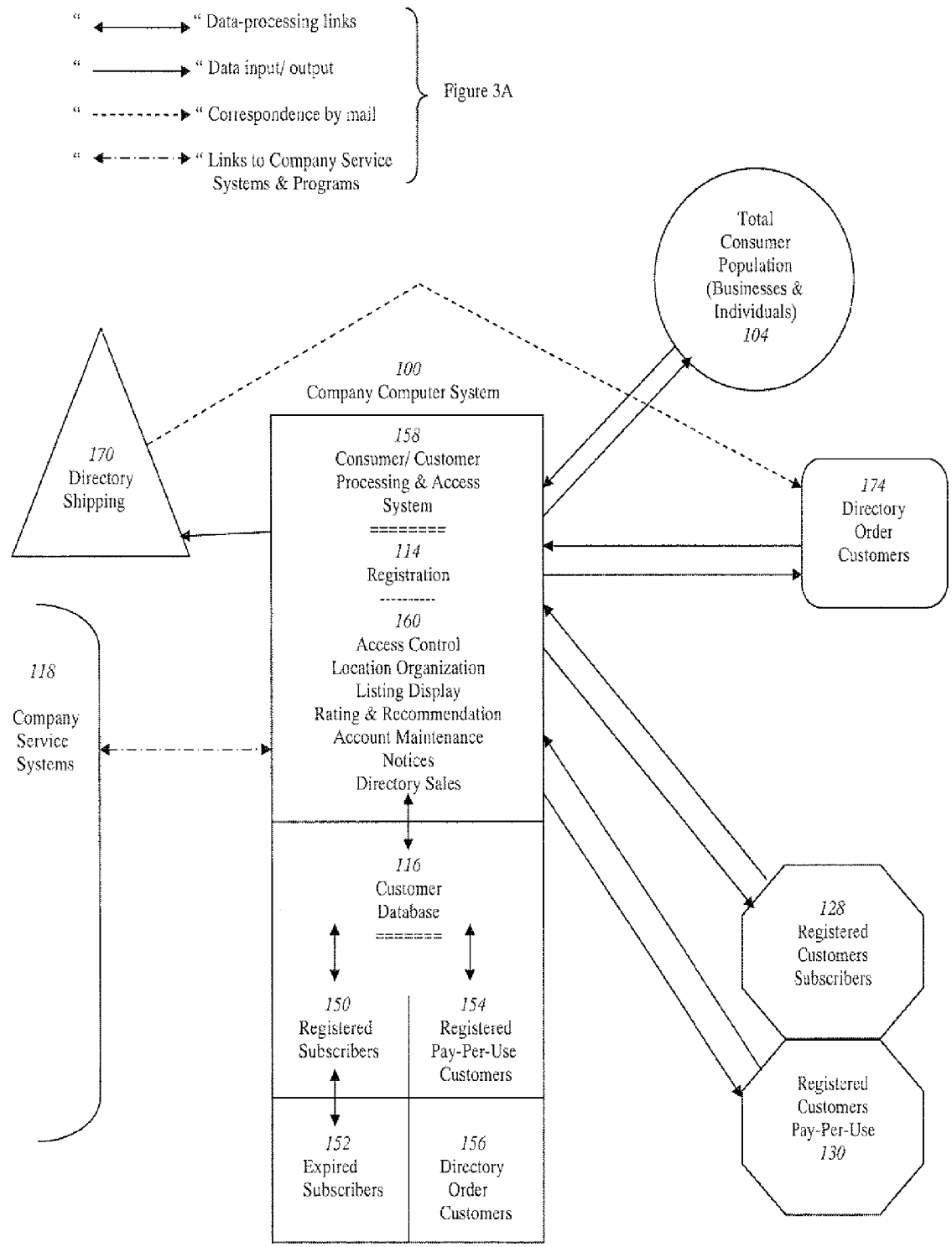

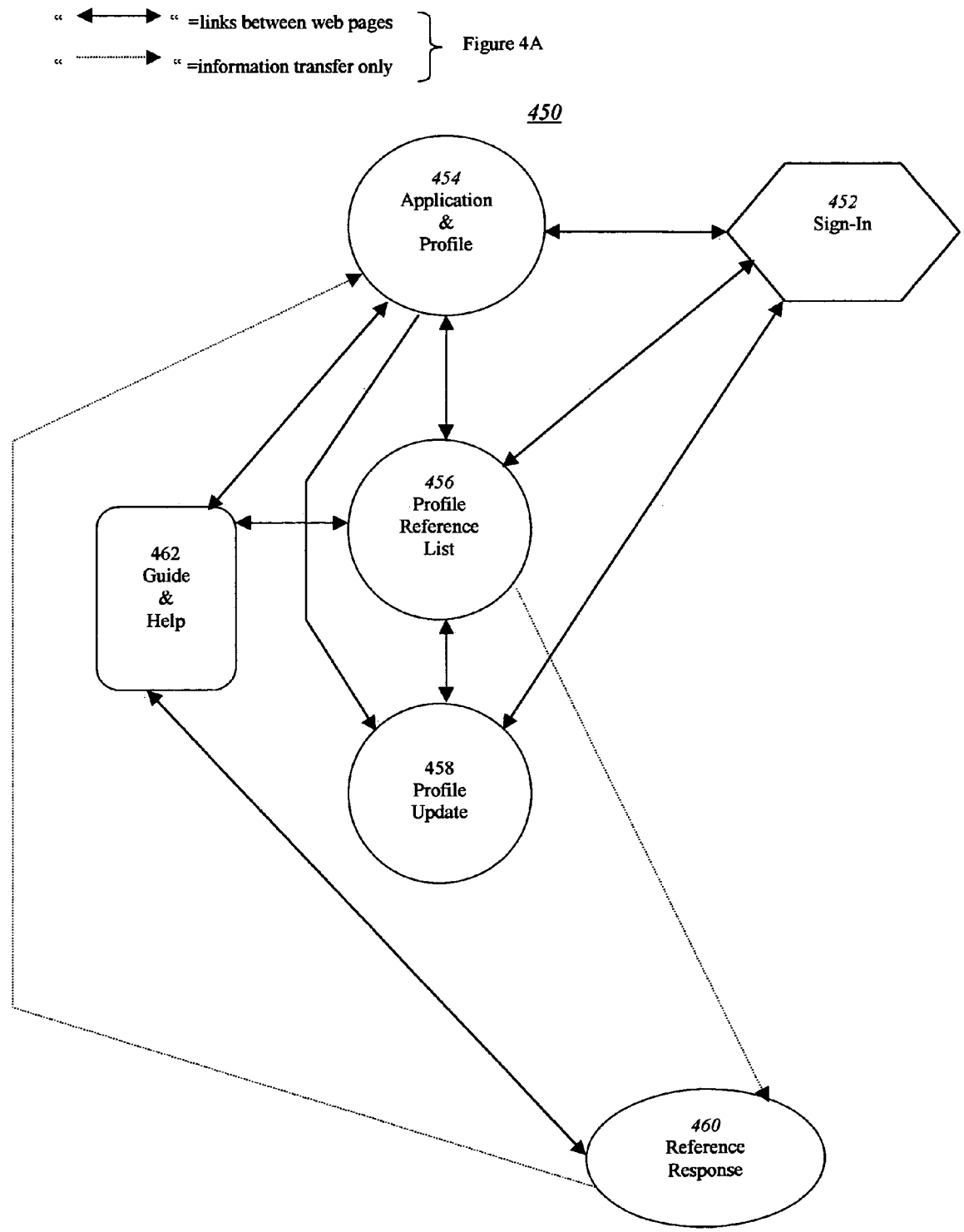
Figure 4 - Service Provider Web-Site page links

Figure 4B - *452*

Service Provider – Sign-In web-site page

*452 a*    System Identification: User Name: [_____] Password: [_____]

Links to other sections: GUIDE & HELP, APPLICATION/ PROFILE, REFERENCE LIST, PROFILE UPDATE

Figure 4C - _454_

Service Provider – Application/ Profile web-site page 454 a     System Identification: User Name [ Automatic transfer from sign-in if registered –or- select ] Password [            ]

454 b     Profile: Business Name [          ] Address [                    ]

454 c     Trade (select) [       ] ⇩ Trade Specialties [                 ]

454 d     Phone # [        ] Fax # [          ]

454 e     E-mail Address [            ]

454 f     Time in Business [        ]

454 g     License # [        ] expiration [ / / ] trade segment [         ] geographic territory [         ]

454 h     Insurance (liability) amount in force $ [        ] expiration [ / / ]

(performance) amount in force $ [        ] expiration [ / / ]

454 i     Owner/ Principal [              ]

454 j     Contact Person [           ] Title [           ]

454 k     Special Training [           ] Certificates held [           ]

454 l     Annual Sales Range (select) $ [          ] ⇩

454 m     Business Organization Type (select) corporation ☐ partnership ☐ sole proprietor ☐ LLC ☐ Other (enter) [      ]

454 n     Credit Card information: account name [           ] card # [           ] expiration [ / ]

billing address [                    ]

454 o     Contact information and trade category made available to third parties: (select) yes ☐ no ☐

454 p     Web-Site listing information: (select) accept ☐ decline ☐ -- If accept: Web-site address [           ]

Links to other sections: GUIDE & HELP, SIGN-IN, REFERENCE LIST, PROFILE UPDATE (Note: " ⇩ " indicates Drop-Down Menu)

Figure 4D - *456*

Service Provider – Reference List web-site page

*456 a*  System Identification: User Name automatic transfer from application, or sign-in page Reference List:
*456 b*      *456 c*                              *456 d*

| Name | Address | Phone # | E-mail Address | Type of Work Done | Date Completed |
|------|---------|---------|----------------|-------------------|----------------|
|      |         |         |                |                   |                |
|      |         |         |                |                   |                |
|      |         |         |                |                   |                |
|      |         |         |                |                   |                |
|      |         |         |                |                   |                |
|      |         |         |                |                   |                |

Links to other sections: GUIDE & HELP, APPLICATION/ PROFILE, PROFILE UPDATE, SIGN-IN

Figure 4E - *458*

Service Provider – Profile Update web-site page

*458 a*  System Identification: User Name automatic transfer from application, or sign-in page    Change Password:

*458 b*  Profile: Business Name automatic transfer from database  Address
- Trade automatic transfer from database (enter addition) ____ Trade Specialties ____
- Phone # ____ Fax # ____
- E-mail Address ____
- Time in Business ____
- License # ____ expiration / / trade segment ____ geographic territory ____
- Insurance (liability) amount in force $ ____ expiration / /
- (performance) amount in force $ ____ expiration / /
- Owner/ Principal ____
- Contact Person ____ Title ____
- Special Training ____ Certificates held ____
- Annual Sales Range (select) $ ____
- Business Organization Type (select) corporation ☐ partnership ☐ sole proprietor ☐ LLC ☐ LLP ☐
- Credit Card information: account name ____ card # ____ expiration /
- billing address ____
- Contact information and trade category made available to third parties: (select) yes ☐ no ☐
- Web-Site listing information: (select) accept ☐ decline ☐ -- If accept: Web-site address ____

*458 c*  Response to Inaccurate Data notice: ____

*458 d*  Response to Report of Special Situations notice: ____

Links to other sections: GUIDE & HELP, SIGN-IN, REFERENCE LIST (Note: "⇩" indicates Drop-Down Menu)

Figure 4F - *460*

Service Provider- Reference Response web-site page

*460 a* Reference Respondent Identification:
   Name [_____] Address [_____] contact code # [____]
   Above will be automatically transferred from incoming internet response message or entered here

*460 b* Service Provider Identification: :Name/ Address/ applicant code # automatically transferred from outgoing log in database

*460 c* Work Description: type of work/ completion date automatically transferred from outgoing log in database

*460 d* Work Confirmation: (select) confirmed ☐ or- corrected ☐ (enter correction) [_____]

*460 e* Job Size: (select) major ☐ or – minor ☐

*460 f* Satisfaction Rating: Dependability      (select) excellent ☐ good ☐ average ☐ fair ☐ poor ☐

Quality of Work     (select) excellent ☐ good ☐ average ☐ fair ☐ poor ☐

*460 g* Total Number of Times Used: [____]

*460 h* Report of Special Situations: [_____]

Links to other sections: GUIDE & HELP, CONSUMER SIGN-IN, CONSUMER REGISTRATION

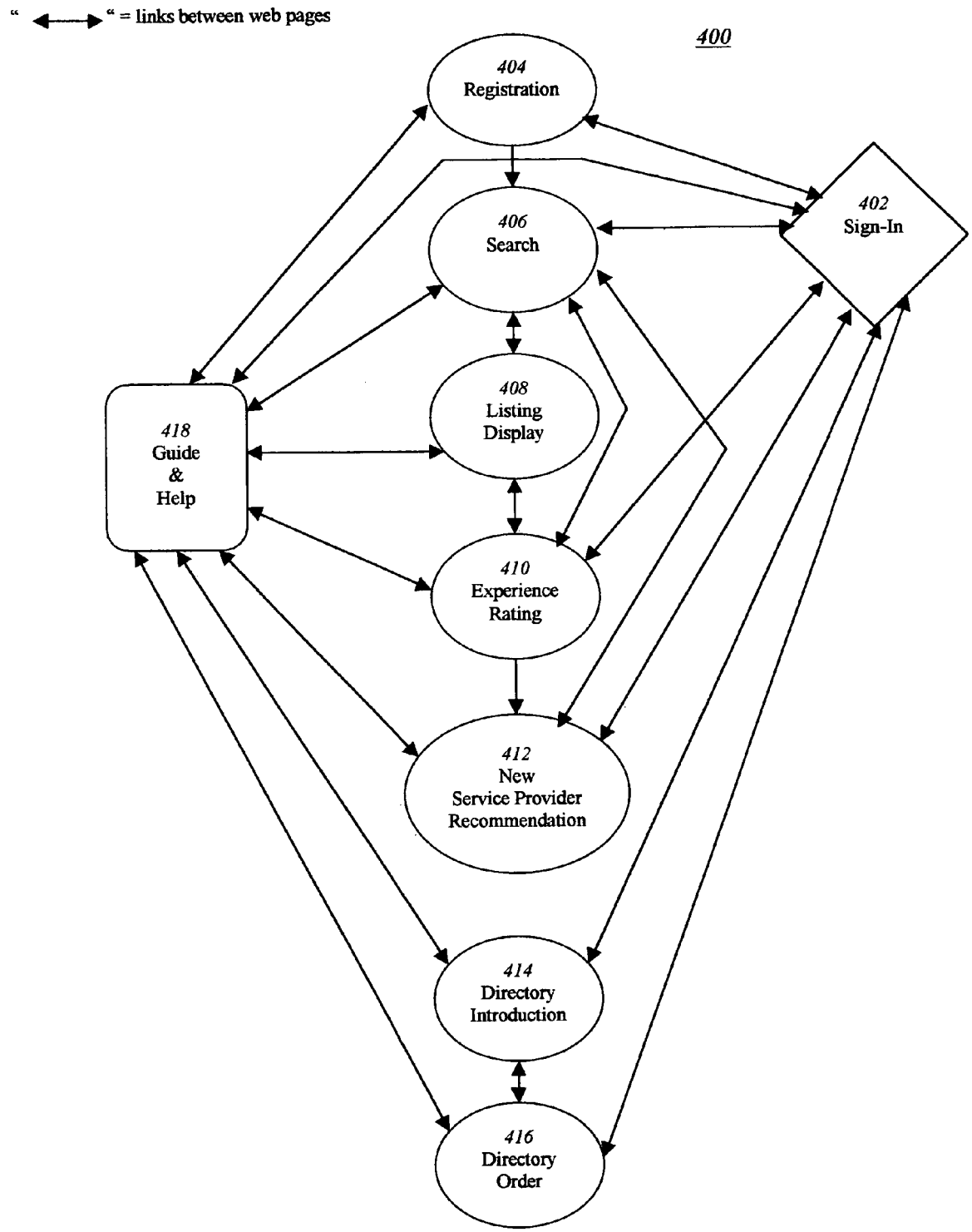
Figure 5 - Consumer/ Customer Web-Site page links

Figure 5A - *402*

Consumer/Customer – Sign-In web-site page

*402 a*   System Identification: User Name: [          ]   Password: [          ]

Type of account: (select) annual subscription ☐ pay-per-use ☐

*402 b*   Pay-Per-Use account – enter - Credit card information:

account name [          ]   account # [          ]   expiration [  /  ]

Links to other sections: GUIDE & HELP, REGISTRATION, SEARCH, CONSUMER EXPERIENCE RATING, NEW SERVICE PROVIDER RECOMMENDATION, DIRECTORY INTRODUCTION, DIRECTORY ORDER

Figure 5B - *404*

Consumer/Customer – Registration/ Profile web-site page

*404 a* Name: [                    ]    Address: [                                        ]
Phone #: [           ]    Fax #: [           ]    E-mail Address: [                ]
*404 b* (Select): Business ☐ -or- Individual ☐
*404 c*    Business: contact name [          ]    title [          ]    trade [          ]
          (select) local ☐ regional ☐ national ☐ international ☐ (optional) volume range [     ⇩]
*404 d*    Individual: occupation [        ⇩] family size [   ] ages [    ⇩]
          (optional) family income [    ⇩] # of cars [   ] (select) homeowner ☐ rent ☐
*404 e* System Identification: User Name: [          ]    Password: [          ]
*404 f* Type of account: (select) annual subscription ☐ pay-per-use ☐
*404 g* Credit card information: account name [          ]    account # [          ]    expiration [  /  ]
*404 h* Subscription renewal: (select) automatic renewal ☐ send notice ☐
*404 i* Contact information made available to third parties: (select) yes ☐ no ☐

Links to other sections: SIGN-IN, GUIDE & HELP, SEARCH, DIRECTORY INTRODUCTION

(Note: " ⇩ " indicates Drop-Down Menu)

Figure 5C - *406*

Customer – Search web-site page

*406 a*  User Name: <u>automatic transfer from sign-in page</u>

*406 b*  Trade Category: (select) [⇩]

*406 c*  Listing match parameter: (select) my zip code ☐ other zip code ☐ other state ☐   specific service provider ☐

(enter) [    ]   (select state) [⇩]   (name) [       ]

(address) [       ]

(phone #) [       ]

*406 d*              SERVICE PROVIDER LISTING SCHEDULE  (from match parameters)

| (Select) | Name | Address |
|---|---|---|
|  |  |  |
|  |  |  |
|  |  |  |

*406 e*  Customer comments and suggestions: [                    ]

Links to other sections: SERVICE PROVIDER LISTING DISPLAY, CONSUMER EXPERIENCE RATING, NEW SERVICE PROVIDER RECOMMENDATION, GUIDE & HELP, SIGN-IN (Note: " ⇩ " indicates Drop-Down Menu)

Figure 5D - *408*

Customer – Listing Display web-site page

User Name: automatic transfer from sign-in page

Service Provider Profile: Business Name automatic transfer from search page Address automatic transfer from search page Trade automatic transfer from search page Trade Specialties automatic transfer from database Phone # automatic transfer from database Fax # automatic transfer from database E-mail Address automatic transfer from database Time in Business automatic transfer from database

*408 a*

License #, expiration, trade segment, geographic territory automatic transfer from database Insurance (liability) amount, expiration &
        (performance) amount, expiration automatic transfer from database Owner/ Principal automatic transfer from database Contact Person/ Title automatic transfer from database Special Training/ Certificates held automatic transfer from database Annual Sales Range automatic transfer from database Business Organization Type automatic transfer from database

*408 b* Service Provider Ratings: Number of Jobs Reported –

| Type of Job | Major | Minor |
|---|---|---|
| automatic summaries transferred from database | | |

*408 c*     Customer Experience Satisfaction –

| Category | Job Size | # excellent | # good | # average | # fair | # poor | total reporting |
|---|---|---|---|---|---|---|---|
| Dependability: | major | | | | | | |
| | minor | | | automatic summaries transferred from database | | | |
| Quality of work: | major | | | | | | |
| | minor | | | | | | |

*408 d* Service Provider Current Status: automatic transfer from database

Links to other sections: GUIDE & HELP, SEARCH, CONSUMER EXPERIENCE RATING,
    NEW SERVICE PROVIDER RECOMMENDATION Link to Service Provider proprietary web-site

Figure 5E - *410*

Customer – Experience Rating web-site page

*410 a* Subscriber Identification: User Name automatic transfer from sign-in page

*410 b* Service Provider Identification: Business Name automatic transfer from listing display page, or entered here Address automatic transfer from listing display page, or entered here Phone # automatic transfer from listing display page, or entered here

*410 c* Work Description: Type of Job (select) [⇩] Size of Job (select) major ☐ or- minor ☐

Completion Date [ / / ]

*410 d* Satisfaction Rating: Dependability (select) excellent ☐ good ☐ average ☐ fair ☐ poor ☐

Quality of Work (select) excellent ☐ good ☐ average ☐ fair ☐ poor ☐

*410 e* Total Number of Times Used: [ ]

*410 f* Inaccurate Data on Service Provider Listing: Category (select) [⇩]

Correct Data [ ]

*410 g* Report of Special Situations: [ ]

Links to other sections: GUIDE & HELP, SIGN-IN, SEARCH, SERVICE PROVIDER LISTING DISPLAY,
NEW SERVICE PROVIDER RECOMMENDATION (Note: " ⇩ " indicates Drop-Down Menu)

Figure 5F - *412*

Customer – New Service Provider Recommendation web-site page

*412 a*  Subscriber Identification: User Name 

*412 b*  Trade: [          ]

*412 c*  Service Provider Business Name: [               ]

*412 d*  Service Provider Contact Information: address [                         ]

phone # [            ] fax # [            ] e-mail address [            ]

*412 e*  Service Provider Contact Person: name [                 ] title [           ]

Experience Rating:

*412 f*  Work Description: Type of Job (select) [          ⇩] Size of Job (select) major ☐ or- minor ☐

Completion Date [  /  /  ]

*412 g*  Satisfaction Rating: Dependability   (select) excellent ☐ good ☐ average ☐ fair ☐ poor ☐

Quality of Work   (select) excellent ☐ good ☐ average ☐ fair ☐ poor ☐

*412 h*  Total Number of Times Used: [      ]

Links to other sections: GUIDE & HELP, SIGN-IN, SEARCH, SERVICE PROVIDER LISTING DISPLAY, CONSUMER EXPERIENCE RATING (Note: " ⇩ " indicates Drop-Down Menu)

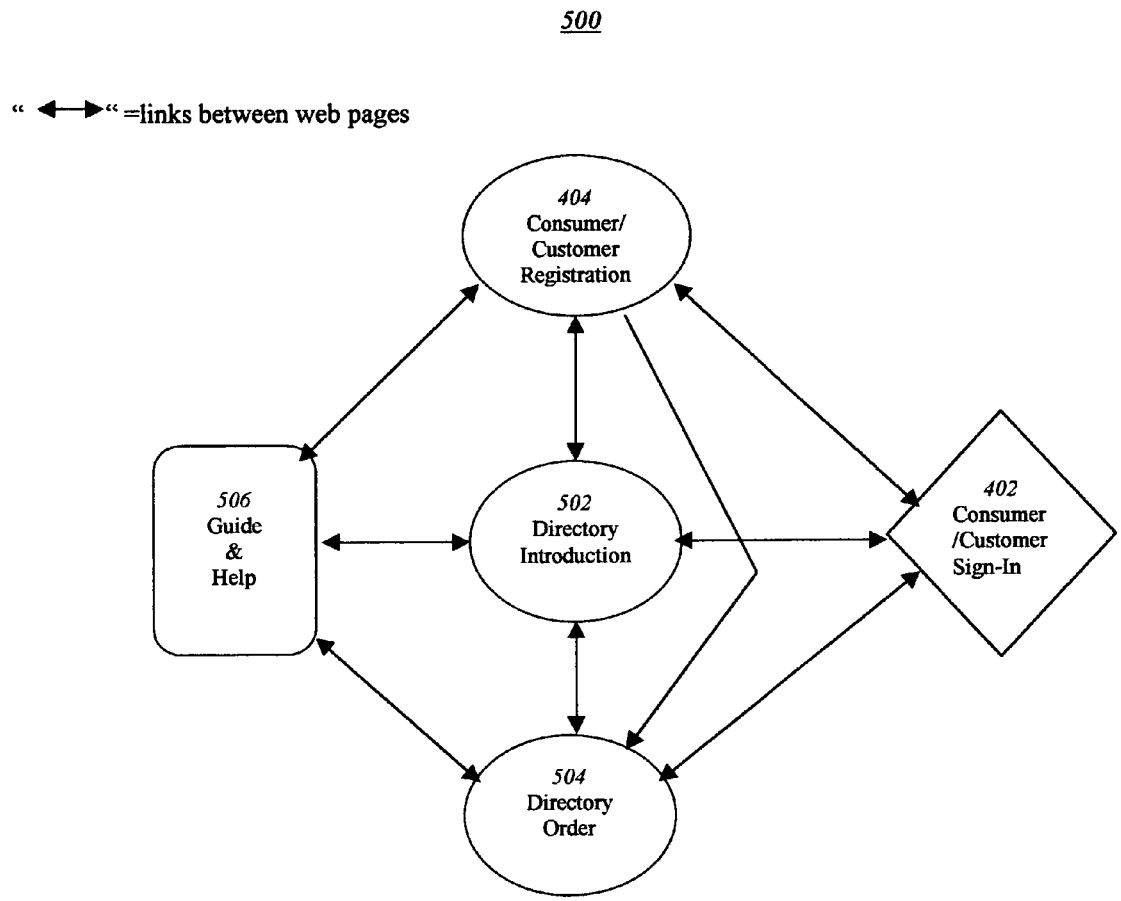
Figure 6 – Printed Text Web-Site page links
*500*

Figure 6A – *504*

Printed Text – Directory Order web-site page

System Identification: User Name: automatic transfer from sign-in page if registered
-or- enter profile information below

*504 a*   Profile: Name:[          ]    Address:[                ]

Phone #:[     ]   Fax #:[     ]    E-mail Address:[     ]

*504 b*   (Select): Business ☐  -or- Individual ☐

*504 c*       Business: contact name [    ] title [    ] trade [    ]

(select) local ☐ regional ☐ national ☐ international ☐ (optional) volume range [  ⇩]

*504 d*       Individual: occupation [  ⇩] family size [  ] ages [  ⇩]

(optional) family income [  ⇩] # of cars [  ] (select) homeowner ☐ rent ☐

*504 e*   Contact information made available to third parties: (select) yes ☐ no ☐

*504 f*   Order: Directory selection parameter: (select) directory for my zip code region ☐ other states ☐

(select states) [  ⇩]

*504 g*   Credit card information: account name [    ] account # [    ] expiration [ / ]

*504 h*   Automatic reorder of next issues of selections: (select) automatic reorder ☐ send notice ☐

Links to other sections: DIRECTORY INTRODUCTION, GUIDE & HELP, CONSUMER SIGN-IN, CONSUMER REGISTRATION (Note: "  " indicates Drop-Down Menu)

ACCESSIBLE SERVICE PROVIDER CLEARINGHOUSE

FIELD OF THE INVENTION

This invention relates to facilitating contact between customers and service providers, and more particularly, to an online service provider clearinghouse. Still more particularly, the present invention provides an automatic web-based computer system and method for establishing business relationships between service providers and customers.

BACKGROUND AND SUMMARY OF THE INVENTION

When seeking service, most individual or business consumers have only the listings in the telephone Yellow Pages or advertising to consult. They have had no method of judging the quality and reliability of service providers, beyond personal referrals or recommendations of friends or relatives. Typically:

Trade or professional associations will only attest to membership in good standing;

Local Better Business Bureaus will advise of membership, and if complaints were filed; and Government licensing departments will confirm if current license is in force, and may have a section to record and investigate complaints.

These resources typically will only attest to whether the service provider has the right to do business in its trade, and sometimes record and publish complaints that are brought to their attention. Even so, many trades and complaints fall through the cracks at this inadequate level. There is no central clearinghouse of service provider's performance that offers insight into their qualification, reliability, and quality of workmanship, and which is easily accessible by the general public to receive or input the needed information.

In the past, people have attempted to use web-based technology to put service providers in contact with potential consumers. For example, several web sites exist that provide a database of service providers. Consumers can search the database for providers specializing in particular tasks or having particular expertise. However, such prior web sites do not provide a component that prequalifies service providers before they are listed in the database, and ensures that listed service providers continue to be qualified.

Certain web-based technology also allows consumers to rate products or services. For example, some web sites act as impromptu forums that allow consumers to write about their experiences and post their writings for other consumers to read. Other web sites invite consumers to post a review or rating for particular products or services. Still other sites (e.g., Consumer Reports) post ratings by a third party (i.e., the Consumer Reports test lab) in a searchable database that can be accessed by consumers on a pay-per-use and/or subscription basis.

However, none of these prior approaches have solved the problem of how to conveniently direct a consumer to a particular service provider meeting certain criteria set by the consumer as well as certain criteria set by an independent third party.

The present invention solves this problem by providing a service that maintains a minimum criteria level for service providers to be listed and available for public access. It can list not only the service provider's credentials and insurance support (with monitored expiration dates), but may also provide a current up-to-date rating system by the users themselves, as to the satisfaction level of the quality and reliability of the work performed. It can also offer a double-check of the credentials by customer verification input. Furthermore, the example service provided by the present invention can be easily accessible by the general public (for individual or business use) on the Internet, or by printed text directories sold in bookstores.

An implementation of the present invention provides the following advantageous features and/or advantages:

Compile profile information of service providers (through solicitation, advertising or recommendation), and organize in database by trade and location.

Qualify service providers above minimum standards. Qualification categories may include: a) duration of business, b) meeting licensing requirements, c) insurance coverage, and d) customer experience references. Qualification information may be updated continually by company through service provider or consumer input, to maintain minimum standards.

Qualification information, including updates and consumer experience ratings, are maintained in the database as part of the individual service provider's profile, available for selection on the web-site by the consumer. Only information for service providers above minimum standards is displayed on the web-site.

Consumers sign on to web-site with their individual (personal or business) profile information.

Consumers become customers after registration.

Web-site is accessible by customers (pay-per-use or by subscription) to find qualified service providers in a specific trade, in close proximity to their home or business. The web-site cross-references the customer trade request and their zip-code with service providers in the database under that trade, in or near the same zip-code. The web-site may also be searched for a specific service provider. Customers can enter on the web-site, their individual experience rating for a listed service provider. This will be added to the rating summary in the database for that service provider.

Customers can recommend to the company, through the web-site, additional service providers for listing consideration. Such recommendation will automatically cause the system, after checking for duplication, to generate the mailing of a listing application invitation to that service provider.

BRIEF DESCRIPTION OF THE DRAWINGS

These and other features and advantages provided by the present invention will be better and more completely understood by referring to the following detailed description of preferred embodiments in conjunction with the drawings of which:

FIG. 1 illustrates the overall operation of an example process, including flow of information, provided by a preferred embodiment implementation of this invention;

FIG. 2 diagrams an example Service Provider system, including application, maintenance and monitoring processes;

FIG. 2A shows the significance of the links shown in FIG. 2;

FIG. 3 diagrams example Customer Processing and Access systems, including registration and use;

FIG. 3A shows the significance of the FIG. 3 links;

FIG. 4 diagrams example Service Provider Web-Site pages linkages;

FIG. 4A shows the significance of the FIG. 4 links;

FIGS. 4B-4F show example consumer web-site pages;
FIG. 5 diagrams Customer Web-Site pages linkages;
FIGS. 5A-5F show example service provider web-site pages;
FIG. 6 shows example Printed Directory order page links; and
FIG. 6A shows an example directory order web-site page.

DETAILED DESCRIPTION OF PRESENTLY PREFERRED EXAMPLE EMBODIMENTS

FIG. 1 shows an overall view of a web-based computer system 100 provided in accordance with this invention. Computer system 100 facilitates contact between a service provider population 102 and a consumer population 104. In more detail, computer system 100 allows customers 128 and 130 within consumer population 104 to locate listed service providers 126 within service provider population 102 that fits the consumer's needs, and to contact those service providers (e.g., via e-mail or other electronic communication). Computer system 100 also allows service provider population 102 to input information that will help customer population 128 and 130 to locate and choose particular service providers for particular tasks. Computer system 100 also provides various feedback techniques and protocols allowing the customer population 128 and 130 to, for example, comment on a good or bad job a service provider 124 and 126 has performed.

In this particular example, computer system 100 includes the following main components:
  a service provider processing system 110 coupled to a service provider database 112;
  a customer registration system 114 coupled to a customer database 116;
  various service systems and programs, including a search and listing match algorithm, a rating update algorithm, a recommendation processing algorithm, an overall monitoring algorithm, and sales and financial applications; and
  an operating system 120.

In this example, computer system 100 may be constructed in whole or in part as a web server operating under a UNIX operating system 120 and providing conventional access to databases 112, 116 using Oracle, SQL or other conventional database management software. Some or all of systems and programs 118 may be implemented using Java based applets and/or written in the C++ programming language.

Computer system 100 creates and maintains databases 112 based upon various inputs from the outside world. The primary inputs may come from service provider population 102 and consumer population 104, et al.:
  service provider references 122;
  suspended service providers 124;
  listed service providers 126;
  registered customers who are subscribers 128; and
  registered customers who have registered as pay-per-use customers 130.

As will be understood, the listed service providers 126 and registered customers 128, 130 might be considered to be within service provider population 102 and consumer population 104, respectively, but have been shown separately because they have previously registered for the service. These various users may access computer system 100 via conventional web browser based appliances communicating with the computer system over the Internet or other digital communications network.

FIG. 2 shows computer system 100 from the point of view of the service provider population 102. The various links shown in FIG. 2 are explained in FIG. 2A. In this example, service provider population 102 may interact directly with computer system 100 via web-based pages and browsers. Alternatively, some service providers within service provider population 102 may choose to interact with computer system 100 via a data entry staff 134. Service provider references 122 (which may sent via be letters, phone calls, web page forms, etc.) may be provided directly to computer system 100 and/or via data entry staff 134 Computer system 100 interacts with listed service providers 126 and suspended service providers 124 via various means including e-mail, letters delivered by the U.S. Postal Service, etc.

As shown in FIG. 2, computer system 100 includes service provider processing system 110 and service provider database 112 mentioned above. Computer system 100 supports additional applications including an application/profile and update, reference processing, monitoring and criteria maintenance processes, and notices 140 to support the service provider processing system 110. Service provider database 112 is maintained based upon a suspended listing processing routine 142, an inactive and de-listed processing routine 144, and an active listings maintenance routine 146.

FIG. 3 shows computer system 100 from the standpoint of consumer population 104. In this example, computer system 100 interacts with registered customers as both subscribers 128 and as pay-per-use customers 130. Computer system 100 includes customer database 116 supported by the registered subscriber processing routine 150, an expired subscriber processing routine 152, a registered pay-per-use customer processing routine 154, and a directory order customer processing routine 156. Computer system 100 includes a consumer/ customer processing and access system 158 that includes registration system 114 as well as additional processing 160 which may include access control, location organization, listing display, rating and recommendation processing, account maintenance, printed text sales and notices. In accordance with one aspect provided by this invention, a customer may order a printed directory using directory order maintenance 156, and computer 100 will interact with a directory shipping process 170 to ship (e.g., via mail, UPS, etc.) a printed directory of listed service providers 126 to directory order customers 174.

Generally, the example computer system 100 provides a web-site structure including a home page that contains bold company logo and general company introduction. It is also a primary link to supporting section main pages. All pages have company identification, logo and web-site address. Each page in system 100 further includes a link to the Guide and Help section main page that may contain links to and including the following sub-pages:
  Explains service, how to register as consumer and how to use (links to Consumer Sign-in, Registration, Search pages);
  Describes service provider qualification and listing requirements (links to Search, Listing pages);
  Explains rating system and how to input information (links to Customer Experience Rating page);
  Explains how to recommend new service provider (links to New Service Provider Recommendation page);
  Explains service provider application process, listing requirements and deadlines (links to Service Provider Application Profile, Profile Update, Reference List pages);

Explains service provider reference system and how to input information in response to request (links to Service Provider Reference Response page); and Explains how to order printed text directories (links to Directory Introduction, Directory Order pages).

Service Provider Section

Example Service Provider Page Structure

An example service provider section main page link structure 450 is shown in FIG. 4. Page structure 450 includes the following pages in the preferred example, connected by hypertext links as shown in FIG. 4:

sign-in page 452,
application and profile page 454,
profile reference list 456,
profile update page 458,
reference response page 460,
guide and help page 462.

As reflected in FIG. 4A, most of the links shown in FIG. 4 provide hypertext links between web pages. However, certain of the links (see FIG. 4A) are information transfer only. For example, in the preferred example, the user cannot navigate directly from profile reference list page 456 to reference response page 460, but information is transferred from the former to the latter. Similarly, the user does not navigate via a hypertext link directly from reference response page 460 to application and profile page 454, but information is transferred as shown.

The following describes each of the pages 452-462 of FIG. 4 in more detail in connection with FIGS. 4B-4F.

Sign-In Page 452

Sign-in page 452 will have, in an example embodiment, a pre-registered service provider section requiring user-name/password to open reference list and profile update pages, notices of company non-liability (links to application/profile, reference list, profile update, guide and help pages). An example service provider-web-site sign-in page format 452 may include user name and password entry space 452a. See FIG. 4B.

Application Profile Page 454

Application profile page 454 will have, in an example embodiment, explanation of company-services and fees for service providers, entry space for the information items as described below, selection of user-name/password, credit card information entry, proprietary web-site listing agreement, notices of minimum requirement criteria and company rules, service provider liability/company non-liability agreement (links to profile update, reference list, guide and help, sign-in pages).

Example service provider-listing application/profile form or web-site application/profile page format 454 as shown in FIG. 4C may include the following fields:

Service Provider identification—user-name/password selection entry 454a;
Business name and address 454b;
Trade and trade specialties 454c;
Business contact information 454d—phone #, fax #
Business e-mail address 454e;
Length of time in business 454f;
License #, trade segment and geographic territory covered, expiration date 454g;
Insurance carried (liability and performance), amount, expiration date 454h;
Name of owner/principal 454i;
Contact person and title 454j;
Special training, certificates held 454k;
Annual volume range 454l;
Business organization type 454m;
Credit card entry section with confirmation 454n;
Choice of select profile information (name, address and contact information, and trade with trade specialties) made available to third parties (454o);
Choice of proprietary web-site listing and link on Listing Display page 454p.

Reference List Page 456

Reference list page 456 will have, in an example embodiment, automatic transfer of service provider identification from application profile or sign-in pages, section to enter for each reference name and address and contact #s, what work done and when completed, notice of non-family/non-affiliate requirement (links to application profile, profile update, guide and help, sign-in pages).

Example service provider-web-site reference list page format 456 shown in FIG. 4D may include the following fields:

System identification user name 456a (automatic transfer from application/profile page);
References list 456b-entry section for name of 6 or more references of work done within the last 24 months (excluding family and business affiliates);
Reference contact 456c-entry section for address and phone #/fax #/e-mail address;
Work description 456d—type of work and when completed for each.

Profile Update Page 458

Profile update page 458 will have, in an example embodiment, automatic transfer of service provider identification from application profile or sign-in pages, entry space for update of profile information items as described above (business name and trade cannot be changed without re-application.), entry spaces for response to allegations of inaccurate data or unlawful/treacherous business practices, notices of procedures for updating information for requirements and responding to allegations, and notices of liability/non-liability (links to reference list page, guide & help and sign-in pages).

An example service provider—web-site profile update page format 458 shown in FIG. 4E may include the following fields:

Service Provider identification 458a—user-name/password entry section; space for reselection of password;
Service Provider Profile 458b—automatic transfer of profile information items from Application/Profile Space for re-selection of last 2 items (information to third parties and web-site listing);
Response 458c to allegations of inaccurate data-entry space;
Response 458d to allegations of unlawful or treacherous business practices—entry space.

Reference Response Page 460

Reference response page 460 will have, in an example embodiment, automatic transfer of reference identification from incoming internet address or reference name/address and contact code # entry space (computer will match to code of out going message, will not accept input/display information from no match or from service provider), automatic display of outgoing information, confirmation check or entry space for correction of outgoing information, entry selection for size of job and satisfaction rating, notices of non-family/ non-affiliation requirement and truthful responsibility (link to guide & help, consumer sign-in and registration pages).

An example service provider—web-site reference response page format 460 shown in FIG. 4F may include the following fields Respondent identification 460*a*-name and address and contact code # (automatically transferred from incoming Internet message or entered here in space provided);

Service provider identification 460*b*—name and address and applicant/listing # (automatically transferred from outgoing log in database);

Work description 460*c*—type of work and when completed (automatically transferred from outgoing log in database);

Work description confirmation 460*d*-select confirmation check or entry space for correction;

Work additional information 460*e*—select size of job (minor or major);

Work satisfaction rating 460*f*-dependability: select from excellent/good/average/fair/poor, quality of work: select from excellent/good/average/fair/poor;

Number of times used 460*g*—enter #;

Report of special situations 460*h*-enter information on unlawful or treacherous business practices.

General Processing of Service Provider Section

Referring to FIGS. 2 and 4, service providers are identified and solicited, initially through advertising in local newspapers and trade publications, and data is collected from them. Ads will include mail-in coupons and 800 phone numbers to request a listing application form, and the web-site access address to enter the application information into database directly on line. Other solicitations may include:

Solicitation letters sent to service providers on targeted list, or from recommendation of customer subscriber. The letter will include mail-in coupons and 800 phone numbers to request a listing application form, and the web-site access address to enter the application information into database directly on line.

E-mail invitation messages broadcast to service providers on targeted list or registered with other Internet services. The message will include the web-site access address for the service provider to enter the application information into database directly on line.

Data entry clerks will enter data from mail-in applications and reference responses into the database. Applicants with Internet access will be able to complete the application directly on the company web-site. The initial application process will include selection of a user-name and password, which must be used for all future update entries. Applicants will be charged an annual listing fee (which may be waived), payable upon application and at every annual renewal. In one particular example, should the applicant not attain listing, the fee will be refunded. However, once listed the fee will be considered fully earned, and any termination of listing at any time during the year will not entitle service provider to a refund of any portion in that example.

Service provider database 112 will organize applications by state, subdivided by trade categories, in alphabetical order of business name. Service providers will be able to be identified and located in the database by name and city-state or by telephone number, so that references will be easily matched. The computer system 100 will maintain a minimum criteria level for all applicants (e.g., minimum 2 years in business, required licenses maintained and currently in force, liability insurance maintained and currently in force). Applicants that do not meet the minimum criteria (e.g., under 2 years in business, lack of license and/or insurance in force) will be sent letters of explanation if they applied by mail, or will be notified while on line during entry of their application on the company web-site. The database 112 will retain the sub-minimum applicant's information for a period of 6 months, to allow for re-qualifying, after which time it will be automatically placed in inactive file requiring reapplication.

The computer system 100 will print and mail questionnaires to all references of service provider applicants that meet the minimum criteria. The questionnaire will be pre-printed with the reference name and address, as well as the business name and address of the service provider. In the case where an e-mail address is furnished, the questionnaire will be sent over the Internet. They will be asked to confirm the type of work and when it was completed (only work that is completed and has been completed within the last 2 years will be accepted), plus indicate the relative size of job (minor or major), and give their satisfaction rating (in the format shown on the Listing page display). The questionnaire will include a self addressed prepaid envelope. It will also have the company web-site address prominently displayed to promote on-line automated responses, which will automatically enter the information in the database. The web-site will be programmed not to send reference requests to or accept reference responses from the service provider's own Internet address. If the request is sent by Internet transmission, it will only accept responses from the same Internet address.

The computer system 100 will hold application in the database 112 in suspense mode 142 until 3 positive responses have been received and recorded. If there have not been 3 positive responses received by 30 days from mailing, the computer will issue a second letter or e-mail notice to all references who have not responded, with a summary notice to the applicant. After 60 days a reminder notice will be sent to all outstanding references, with another summary notice to the applicant. At either step the applicant may submit additional references, who will automatically be sent questionnaires. After 6 months from the date of the last mailing the application will be automatically placed in inactive file 144 requiring reapplication. Should the company receive any negative reference responses, then the applicant must receive 5 times the number of negative responses in positive responses to be approved for listing. Upon receipt of a negative response, the computer system 100 will issue a notice advising the applicant of the negative response and the calculation for positive responses needed to meet the new requirement level taking into account positive responses already received.

Upon attainment of all minimum requirements, including sufficient positive references, an application will automatically be converted to a Listing 146, available for access by customers on the company web-site 118. All entered information will be stored and organized in the database so that the computer can access it for various uses, which include:

Identification of the service provider for access and use of the various service provider web facilities/pages. Identification will automatically transfer over to open each page accessed, which is permitted.

Identification of service provider location by zip code for inclusion in listing display of trading area selected by customer Identification and display of profile and ratings when selected on Listing page Identification and display of basic information when selected on Customer Experience Rating and Reference pages Updating profile and ratings from Profile Update, Customer Experience Rating and Reference pages Automatic and manual administration of minimum maintenance criteria and other company rules Anniversary date/expiration of service providers listing for control and renewal notification Identification for response to input message or notice Creation of summaries of company listing-base to analyze and maximize business Creation of lists for company marketing and research Creation of lists to be sold to third parties Computer system 110 will maintain minimum requirement criteria for listed service providers as well. At 60 days prior to expiration of license and insurance, computer system 110 will issue notice to service provider to update. At 30 days prior to expiration, computer system 110 will issue a reminder. If either is not made current by the expiration date, the listing will automatically be de-listed from consumer availability. It will be held in the database 112 in suspense mode 142 until brought current, at which time it will be automatically be re-listed. Should the service provider not be able to bring the license/insurance current within 6 months from de-listing, the account will be automatically placed in inactive file 144 requiring reapplication.

The minimum required ratio of positive to negative consumer ratings that a service provider must maintain to stay listed will be 5/1. At such time as they fall below that level, the computer system 100 will issue a notice to the service provider. The listing will be de-listed automatically after 90 days from the date of that notice, should it not be brought back up in the interim, or immediately if the ratio drops to 3/1. The ratings will include the original references, and the service provider may submit additional references to help restore the ratio. Should the service provider not be able to bring the ratio back to the required listing minimum within 6 months from de-listing, the account will be automatically placed in inactive file 144 requiring reapplication.

Discovery of untruthful information supplied by or for the service provider will be cause for immediate de-listing. Upon receipt of report of discrepancy of material profile information (i.e. necessary to maintain minimum criteria), computer will automatically send notice to service provider requesting verification of the item in question. Upon receipt of the verifying documents, a Service Manager will determine and update the correct data as well as deciding if the inaccuracy was by error or deceit. Should the service manager decide that the inaccuracy was deceit, or if the verifying documentation has not been received within 30 days from the notice, then the service provider's Listing will be noted and de-listed, and held in suspense mode 142. A second notice will be sent to the service provider, requesting the missing information or satisfactory explanation. Should the Service Manager not approve the Listing by 90 days from the first notice, the account will be automatically placed in the inactive "do not list" file 144 with notation for future reference.

Discovery of unlawful or treacherous business practices will be cause for immediate de-listing. Upon receipt of a report of unlawful or treacherous business practices, computer will automatically send notice to service provider requesting an immediate response. A notice will also be generated by internal e-mail to the company Review Manager, who will investigate. Should the Review Manager not approve the Listing within 30 days from the notice, the account will automatically be noted and de-listed, and held in suspense mode 142. Should the Review Manager not approve the Listing within 90 days from the first notice, the account will automatically be placed in the inactive "do not list" file 144 with notation for future reference.

Example Consumer/Customer Page Structure

FIG. 5 shows an example structure 400 a consumer/customer may navigate through and view when using system 100. The example FIG. 5 structure 400 includes the following pages connected by hypertext links:

a sign-in page 402,
a registration page 404,
a search page 406,
a listing display page 408,
an experience rating page 410,
a new service provider recommendation page 412,
a directory introduction page 414,
a directory order page 416,
a guide and help page 418.

The following discussion briefly describes each of pages 402-418 in connection with FIGS. 5A-5F.

Sign-In Page 402

Sign-in page 402 will have, in an example embodiment, pre-registered subscriber section requiring user-name/password to open search page, pre-registered pay-per-use customer section requiring credit card information and user-name/password to open search page, new customer section, notices of non-liability (links to registration, search, customer experience rating, new service provider recommendation, directory introduction, directory order, guide and help pages).

An example consumer/customer-web-site sign-in page format shown in FIG. 5A may include the following fields:

User-name and password entry section 402a
Credit card entry section 402b with confirmation for Pay-Per-Use customer All transactions of the company through the web site and the computer support systems, will automatically update on corporate financial records.

Registration Page 404

Registration page 404 will have, in an example embodiment, customer profile entry section, choice of type of service and cost, choice of inclusion on sold lists, automatic transfer of customer identification information from sign-in page if registered, selection of user-name/password, update capability, company non-liability acceptance agreement (links to sign-in, guide and help, search, directory introduction pages).

An example consumer/customer-web-site registration profile page format 404 shown in FIG. 5B may include the following fields:

Name, address, phone #, fax #, e-mail address 404a;
Select individual or business 404b;
If business: contact name/title, type of business, (optional) select-volume range and local/regional/national/international 404c;
If individual: occupation, select-family size/ages; and optionally, family income range, homeowner/rent and # cars 404d;
User-name/password selection 404e;
Choice of pay-per-use or annual subscription 404f;
Credit card information entry section with confirmation 404g;
Choice of automatic renewal of subscription or renewal notice 404h;
Choice of name/contact information made available to third parties 404i.

Search Page 406

Search page 406 will have, in the example embodiment, automatic transfer of customer identification information from sign-in page, drop down menu to select trade categories, choice of listing search by customer zip code match or select other zip code or select from alphabetical list of listings in other city/state or enter specific service provider name/address/phone # (if no match message will appear), notices of company non-liability and reliance on information supplied by service provider and references, customer comment section relating to company service (links to individual service provider listing display, consumer experience rating, new service provider recommendation, guide and help and sign-in pages), will automatically limit multiple searches by pay-per-use customer.

An example customer web-site search page format 406 shown in FIG. 5C may include the following fields:
- Customer identification information (automatic transfer from sign-in or registration page) 406a;
- Trade categories—select from drop-down menu 406b;
- Choice of Listing search 406c—by customer zip code match or enter other zip code or enter city/state or enter specific service provider name/address/phone #;
- Select full display of individual Listing from Listing schedule 406d;
- Customer comments entry section 406e.

Listing Display Page 408

Listing display page 408 will have, in the example embodiment, automatic transfer of customer identification information from sign-in page, (only accessible from search page) display of selected listed service provider profile information items in detail plus reference and experience ratings in summary (if suspended this page will only display "suspended notice" and reason), notices of company non-liability and reliance on information supplied by service provider or references (links to search, guide and help, consumer experience rating, new service provider recommendation pages, as well as link to listed service provider proprietary web-site).

An example customer-web-site service provider listing page format 408 shown in FIG. 5D may include the following fields:
- Service provider profile information 408a transferred automatically from service provider profile/update page;
- Service provider work type 408b summarized by computer into number of jobs reported in each by job size and displayed;
- Service provider ratings 408c summarized by computer from customer experience ratings/references and displayed;
- Service provider current status 408d displayed.

Customer Experience Rating Page 410

Customer experience rating page 410 will have, in the example embodiment, automatic transfer of customer identification information from sign-in page, automatic transfer of service provider identity if this page selected from listing page or service provider identification by automatic match of entered business name/address/phone # with database (if no match message will appear), customer selection of type of work and size of job and entry of completion date (will not accept rating on incomplete work or work more than 1 year prior) and rating and comments, customer report section on inaccurate service provider data and customer report section on unlawful or treacherous service provider business practices (either of which will generate computer notice to service provider and company investigation), information entered will immediately post to customer experience rating summaries displayed on listing page, except inaccurate data or unlawful/treacherous practices reports, notices that the identification of the providers of all information entered here will be kept confidential and furthermore it is serious and may affect service provider's business, notice of non-family/non-affiliate requirement (links to guide and help sign-in, search, listing display, new service provider recommendation pages), will not accept input from non-registered user or internet address of service provider or new reference on same service provider from same customer; if input is updated to a previously filed rating, the computer system 100 will only accept the update from the same internet address.

An example customer-web-site experience rating page format 410 shown in FIG. 5E may include the following fields:
- Customer identification 410a—name and account # (automatically transferred from sign-in page);
- Service provider identification 410b—name and address and phone # (entered here or automatically transferred from listing page with listing #);
- Work entry section 410c—select type of work and size of job (minor or major) from drop-down menu, enter completion date;
- Satisfaction rating 410d—dependability: select from excellent/good/average/fair/poor, quality of work: select from excellent/good/average/fair/poor;
- Number of times used—enter # (410e);
- Inaccurate service provider data on listing 410f—select category from drop-down menu, then enter correct data;
- Report of special situations 410g—enter information on unlawful or treacherous business practices.

New Service Provider Recommendation Page 412

New service provider recommendation page 412 will have, in the example embodiment, automatic transfer of customer identification information from sign-in page, recommended service provider information entry section, customer experience and rating section, notice of non-family and non-affiliation requirement, computer will not accept recommendation from non-registered user (links to guide and help, sign-in, search, listing display, consumer experience rating pages). Computer 100 will check against listed, suspense, declined and de-listed service providers for match. If a match, it will advise status, offer link to listing or customer experience rating pages. If no match, it will automatically issue invitation and application to recommended service provider. See FIG. 5F.

Example customer-web-site new service provider recommendation page format 412 shown in FIG. 5F may include the following fields:
- Customer identification 412a—name account # (automatically transferred from sign-in page);
- Trade 412b;
- Service provider identification—business name 412c;
- Service provider contact information—address and phone #/fax # and e-mail address (412d);
- Service provider contact person—name and title (412e);
- Work entry section 412f—select type of work and size of job (minor or major) from drop-down menu, enter completion date
- Satisfaction rating 412g—dependability: select from excellent/good/average/fair/poor, quality of work: select from excellent/good/average/fair/poor;
- Number of times used 412h—enter #.

General Processing of Consumer/Customer Section

Referring once again to FIGS. 3 and 5, ads in local newspapers and national magazines, television and radio advertising on local and national stations, outdoor ads on billboards and public transportation are used to attract consumers to the system. All advertising will promote company logo, service and web-site address, as well as printed directories.

Promotion efforts will also include promotion to service provider trade groups, and solicitation of their support to promote our service; solicitation of listed service providers to promote our service, including printed handouts for their customers and logo decals/signs; and toll-free 800 phone lines staffed with trained customer service support personnel 24 hours per day.

All consumers will enroll by accessing sign-in page 402 on the web-site, then clicking over to registration page 404 for registration. Registration will include entry of basic profile and contact information, plus optional demographic information. Consumers will also choose type of service (pay-per-use or annual subscription), as well as automatic renewal option. Consumers will select user-names and passwords to allow them access to the Service Provider Listing database. Each registered customer will be automatically assigned a customer account #. All entered information will be stored and organized in the database so that the computer 100 can access it for various uses, which include:

- Identification of the customer for access and use of the various web facilities/pages. Identification will automatically transfer over to open each page accessed, which is permitted.
- Control of use by pay-per-use customers, and anniversary date/expiration for renewal of subscribers
- Identification of customer by zip code to automatically select service providers in the customer's trading area
- Identification of customer for response to input message
- Automatic renewal if selected by customer, or automatic issue of renewal notice to subscribers 60 days prior to expiration if automatic renewal not selected
- Sales and re-order of printed text directories, and inventory maintenance
- Creation of summaries of company customer-base to analyze and maximize business
- Creation of lists for company marketing and research
- Creation of lists to be sold to third parties. After registration consumers are recognized as customers by the system. They will sign on at the Sign-In page.

Customer-Search and Listing Display

Customers will access the search page 406 by clicking over from the sign-in 402 or registration page 404, or back from a listing page. Customer identification will automatically transfer over to this page 406. Customer will select trade category from drop-down menu. They may also select sub-category if available and if desired to refine search. Customer will select search parameters (i.e. Proximity to their zip-code, or proximity to alternative zip-code entered, or alphabetical list from state selected from drop-down menu, or entry of specific service provider name/address/phone #). Computer service systems 118 will cross-match customer selections of trade category/sub-category and parameter with service provider listings in the database. For zip-code parameters, the computer will select the 20 closest proximity matches within that trade category/sub-category, and present them on a listing schedule (by name/address) in descending order of distance from the zip-code. For state parameters, the computer service systems 118 will display all Listings (in a schedule by name/address) in alphabetical order, within that trade category/sub-category in the selected state. For a specific service provider entry, the computer service systems 118 will display the name/address of the listing if it finds a match, or "listing match not found," if no match. Customer will select individual listing and click on listing page, which will display the complete listing information for that service provider.

The Listing page 408 will display name and listing # along with the rest of the first 11 items of the selected Service Provider Profile. It will also display in summary the combined total of Reference Response Ratings and the Customer Experience Ratings in the following breakdown:

| | Minor Size Jobs | Major Size Jobs |
|---|---|---|
| DEPENDABILITY RATING: | | |
| Total # reporting in each rating level: | Excellent-Good-Average-Fair-Poor | Excellent-Good-Average-Fair-Poor |
| QUALITY OF WORK RATING: | | |
| Total # reporting in each rating level: | Excellent-Good-Average-Fair-Poor | Excellent-Good-Average-Fair-Poor |

(For the purpose of "minimum maintenance criteria," the system will count "poor" as negative/"fair" as neutral/"average, good, excellent" as positive ratings.)

The page will also display a summary listing of the number jobs reported by each "Work Type", broken down between "Minor or Major".

These ratings are updated by the computer service systems 118 upon entry of a rating from an acceptable source as defined in both Web-site rating page descriptions. Should the Service Provider's Listing be de-listed, and in suspense mode, this page will display only a notice that the "Listing has been temporarily suspended for _____ (general reason)". Should the Listing become cancelled and placed in the inactive file 144, the Search page listing display will no longer present that Service Provider unless it is entered in the "specific entry option". In which case it will display "De-listed _____ (date)". Should the Service Provider bring the account back to the minimum criteria, the Listing page will be restored. The customer can click to the prior or next Listing on the Search page listing schedule from this page, or they can click back to the Search page to continue the search. If the Service Provider has their own web-site, the link will be on this page. (The company may charge a fee to the service provider for this service.)

Customer—Ratings and References

A customer who is registered can report their experience with a listed service provider by accessing the customer experience rating page 410 on the web-site. This page will be accessible to registered annual subscribers and/or pay-per-use customers. However, it may be limited to subscribers only, since a pay-per-use customer would be more likely to register for the purpose of only entering a rating, due to the lower cost. This page transfers the customer identity from the sign-in or registration pages 402, 404, and the service provider identity from the listing page if the access was made from there. Otherwise the service provider's identity (name/address/phone #) must be entered in the space provided. Upon entry, the computer service system 118 will cross-match the identity information with the database. If there is no match, the page will display "no match", with instructions to recheck and re-enter the information. If there is a match, or if the access was from a Listing page, then the page will accept a report input. The service provider's name/address/Listing # and trade will appear at the top of the page. The customer will select the type of work from the drop-down menu (which the computer automatically supplies based upon the trade selection). Should the type of work experienced not be shown in the drop-down menu the customer will select "other", space will be provided for entry. This entry will initiate a message to the Content Manager, who will review this category for revision. The customer will also select the size of job (minor or major), and enter the completion date. The job must have been completed, and done so within the past 12 months for the computer to accept this report. The customer will rate the service provider and the work from a check-off chart as shown in the above section. The customer will also have the option to select two additional areas for entry. The first will be to report inaccurate data on the service provider listing profile. This will generate a request for verification to the service provider, and then to a Service manager for review. The second will be to report unlawful or treacherous business practices on behalf of the service provider. This will generate a request to the service provider for an immediate response, and an immediate message to the Review Manager for investigation. Either can result in permanent de-listing. Upon completion of the report the computer service system 118 will automatically add it to the database, as well as add the work-type/job-size entry and the rating entry to the proper summaries in the Listing file of this service provider, and recheck the "minimum maintenance criteria". It will also issue the above mentioned notices and set up the proper trigger dates (see Service Provider Listing section), should there have been derogatory information supplied. The identity of the customer will be kept confidential as to any Customer Experience Rating report, unless the customer purposely supplies fraudulent information that is damaging to the service provider.

A customer who is registered can recommend a new service provider for listing consideration, by accessing the new service provider recommendation page 412 on the web-site. This page 412 will be accessible to registered annual subscribers and/or pay-per-use customers. (However, it may be limited to subscribers only, for the reason explained above.) This page transfers the customer identity from the Sign-in or Registration pages 402, 404. The customer will enter the identifying and contact information of the service provider (i.e. business name/address/phone #/fax #/e-mail address), as well as the trade. The computer will search the database to see if there is a match. The search will include listed, suspense mode, de-listed and declined service providers. If there already is a match in the database, this page will display a message that the proposed service provider is already in our database and the current status. If that service provider is a Listing in good standing, it will offer transfer to that Listing page. If there is no match the page will acknowledge that this is new and direct customer to fill in work experience section, by selecting from drop-down menus (i.e. type of work, size of job), and entering the completion date. The job must have been completed, and done so within the past 12 months for the computer to accept this report. The customer will rate the service provider and the work from a check-off chart as shown in the "listing page" section shown above. Upon completion the computer will automatically issue an invitation and application to the recommended service provider, and assign an application # to the file for reference on response. The responses of these recommendations will be will be handled in the same manner, under the same rules, as the service provider reference Responses.

Printed Directory Distribution

Example Printed Order Page

An example printed text directory order page structure 500 is shown in FIG. 6. In this example, page and link structure 500 may include the following pages connected by hypertext links:

the consumer/customer sign-in page 402,
the consumer/customer registration page 404,
a directory introduction page 502,
a directory order page 504, and
a guide and help page 506.

The following describes example directory introduction page 502 and directory order page 504.

Directory introduction page 502 will have, in an example embodiment, explanation of service and directory organization, directory regions and publication frequency and costs, notices of non-liability and reliance on information supplied by service providers and references (links to directory order, sign-in, registration, guide & help pages).

Directory order page 504 will have, in an example embodiment, customer profile entry section, update capability, choice of inclusion on sold lists, automatic transfer of customer identification information from sign-in page if registered, choice of directory order from automatic zip code match or state selection on drop-down menu (multiple issues can be ordered), automatic display of costs of order including shipping & handling, credit card entry section with confirmation check, choice of automatic reorder of next issue of selection (links to directory introduction, sign-in, registration, guide & help pages). Computer service system 118 sends order to fulfillment center and updates inventory/sales data automatically.

An example printed text-web-site directory order page format 504 shown in FIG. 6A may include the following fields:
Name, address, phone #, fax #, e-mail address 504a;
Select individual or business 504b;
If business: contact name/title, type of business, select—local/regional/national/international and (optional) volume range (504c);
If individual: occupation, select—family size/ages and (optional) family income range and homeowner/rent and # cars (504d);
Choice of name and contact information included on lists sold to third parties (504e);
(all above information automatically transferred from Sign-In or registration page if registered)
Choice of automatic zip code match or state selection on drop-down menu (504f);
Automatic display of costs of order including shipping & handling;
Credit card entry with confirmation check (504g);
Choice of automatic reorder of next issues of selections (504h).

Referring to FIGS. 3 and 6, once or twice per year (depending upon demand), the company will publish Printed Text Directories, issued separately for each geographical region, containing the latest Listing data for every listed Service Provider in that region, as of that printing date. The directories will be organized by trade category, with all listed Service Providers of that trade, in that region listed alphabetically. These directories will be offered for sale in the Printed Text section of the company web-site, as well as being distributed through book resellers.

Customers who are already registered can transfer to this section from the Sign-In or Registration pages. Their identifying/address information will automatically be transferred to the Directory Order page. Consumers who are not registered will fill in the full profile information section (i.e. name/address/phone #/fax #/e-mail, business/occupation data, demographic data)

All purchasers will choose between directory selection by automatic zip-code match or state/region on a drop-down menu. Multiple issues can be ordered from the state/region drop-down menu.

At each directory selection, the computer processing system 158 will display the selling price. At the completion of the order the computer will tally each directory selected, with a sub-total, and then add the shipping and handling charge (calculated by the number of directories, weight, and distance based upon the purchaser zip-code), to arrive at a total $ amount due. The purchaser will enter their credit card information and confirm sale.

The purchaser will choose if they would like automatic reorder of the next issue of the directories ordered (which would be billed to their credit card at the time of shipping), or would like automatic notification of the their availability. The computer will maintain the purchaser profile in the database, if not already registered, and any reorder or availability notification.

The computer will automatically send the order to the fulfillment center to be shipped. It will also update inventory and sales data and calculate reorder requirements.

The business described above should receive sufficient revenues to sustain itself and make a profit. In particular, there are at least the following potential sources of revenues from operating the preferred example system discussed above:
  customer subscription and/or pay-per-use fee;
  service provider listing fee;
  service provider's proprietary web site link;
  marketing of customer lists;
  marketing of service provider lists; and
  printed directory.

It would also be possible to offer advertising on the site, and receive revenues from advertising. For example, particular service providers or their suppliers could be permitted to advertise on their own respective listing pages.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of facilitating contact between consumers and service providers by providing a central clearinghouse of service provider performance information that offers insights into at least one of service provider qualifications, service provider reliability and/or service provider quality of workmanship, said central clearinghouse being easily accessible by consumers, said method being performed at least in part by a computer operated by a third party online listing service, said method comprising:
  maintaining listings of service providers in a database;
  imposing minimum mandatory predetermined non-fee based qualification criteria specified by said third party online listing service for service provider listings to be qualified and acceptable for listing and available to consumers;
  allowing consumers to remotely access and search said qualified service provider listings online over a data communications network; and
  presenting information concerning listed service providers in response to searches said consumers perform to search for and display qualified listings; and
  receiving recommendations from consumers for listing additional service providers in said database, and in response to received recommendations, automatically generating communications to said recommended service providers, said communications comprising an invitation to apply for listing, said generating including at least one of (a) generating an electronic application form on a website and sending email with an invitation to complete said electronic application form, and (b) generating at least one application form and delivering said at least one application form to said recommended service providers,
  wherein said maintaining listings includes qualifying service providers for initial listing and continually re-qualifying service providers, at least in part by an automatic computer process, for continued listing.

2. A method as in claim 1 wherein said maintaining listings includes compiling profile information concerning said service providers, and at least one of organizing and indexing said listings within said database by at least one of trade and location.

3. A method as in claim 1 wherein said qualifying and automatically continually requalifying is further based on at least one of the following:
  consumer experience references/ratings,
  meeting licensing requirements,
  insurance coverage, and
  duration of business.

4. A method as in claim 1 wherein said presenting includes conditioning display of listed service providers based on whether qualification information for said service providers exceeds said minimum predetermined non-fee based qualification criteria.

5. A method as in claim 1 wherein said presenting includes preliminarily requiring said consumers to sign on to a web site using an associated individual profile, and then presenting said information by transmitting messages containing said information over said data communication network.

6. A method as in claim 1 wherein said presenting includes allowing consumers to access said information through a web site.

7. A method as in claim 6 wherein said access is on a pay per use basis.

8. A method as in claim 6 wherein said access is on a subscription basis.

9. A method as in claim 1 wherein said presenting includes allowing said consumers to search for a qualified service provider in geographical proximity to the consumer.

10. A method as in claim 1 wherein said presenting includes cross-referencing at least one consumer trade request and zip code with service provider information stored in said database.

11. A method as in claim 1 wherein said presenting includes allowing at least one consumer to search said database for a specific service provider by name or other identification.

12. A method as in claim 1 further including allowing consumers to input an individual experience rating for a service provider, storing said individual experience rating into said database, and using said individual experience rating to determine acceptability of at least one of initial and continued listing of said service provider.

13. The method of claim 12 wherein said using step includes automatically delisting service providers based at least in part on said consumer input.

14. The method of claim 12 wherein said using includes delaying initial listing of said service providers until after receipt of at least some favorable consumer input.

15. A method as in claim 1 wherein said presenting includes printing a directory for said consumers.

16. The method of claim 1 further including requiring at least one favorable consumer experience reference as a condition to list each service provider.

17. The method of claim 1 further including automatically delisting service providers who fail to continue to meet the imposed minimum mandatory predetermined criteria.

18. The method of claim 1 wherein said requalifying includes continually rescoring the qualifications and listing eligibility of said service providers.

19. The method of claim 1 further including actively addressing any service provider that has failed to continue to meet the imposed minimum mandatory predetermined criteria.

20. The method of claim 1 further including automatically and continually monitoring and addressing time dependent qualification criteria, licensing and insurance criteria, including expiration dates, related to said service providers.

21. The method of claim 1 further including displaying listing rules for service providers and said imposed minimum mandatory predetermined criteria to consumers.

22. The method of claim 1 wherein said maintaining listings step includes qualifying service providers based on at least two of the following imposed minimum mandatory predetermined criteria: consumer experience references, meeting licensing requirements, insurance coverage, and duration of business.

23. The method of claim 1 wherein said maintaining listings comprises receiving a listing application from a service provider and sending a responsive communication.

24. The method of claim 23 further including initiating a reference request and evaluating a response thereto.

25. The method of claim 23 further including monitoring, scoring and addressing responses to service providers and references.

26. The method of claim 1 further including sending an invitation to apply for listing and complete an application.

27. The method of claim 1 wherein said listing includes automatically processing a listing application; automatically initiating a reference request; and automatically monitoring, scoring and addressing responses.

28. A method as in claim 1 further comprising using consumer-provided input to determine whether service providers have met said minimum mandatory predetermined non-fee based qualification criteria so as to make them qualified and acceptable for initial and/or continued listing.

29. The method of claim 1 further including automatically recognizing and providing notice to a service provider when qualification criteria for said service provider falls below said minimum mandatory predetermined non-fee based qualification criteria.

30. A method of facilitating contact between consumers and service providers by providing a central clearinghouse of service provider performance information that offers insights into at least one of service provider qualifications, service provider reliability and service provider quality of workmanship, said central clearinghouse being easily accessible by consumers, said method being performed at least in part by a computer operated by a third party online listing service, said method comprising:

maintaining listings of service providers in a database;

imposing minimum mandatory predetermined non-fee based qualification criteria specified by said third party online listing service for service provider listings to be made available to consumers, including using consumer-provided input to determine automatically and on a continual basis whether service providers have met said minimum mandatory predetermined non-fee based qualification criteria so as to make them qualified and acceptable for at least one of initial and continued listing;

allowing consumers to remotely access and search said qualified service provider listings online over a data communications network;

presenting information concerning listed service providers in response to searches said consumers perform to search for and display qualified listings, storing, in said database, a profile associated with each of said service providers, maintaining qualification information pertaining to said service providers, including updates and consumer experience ratings, as part of each individual service provider's profile, and receiving recommendations from consumers for listing additional service providers in said database, and in response to received recommendations, automatically generating communications to said recommended service providers, said communications comprising invitations to apply for listing, said generating including at least one of (a) generating an electronic application form on a website and sending email with an invitation to complete said electronic application form, and (b) generating at least one application form and delivering said at least one form to said recommended service providers.

31. The method of claim 30 further including automatically recognizing and providing notice to a service provider when qualification criteria for said service provider falls below said minimum mandatory predetermined non-fee based qualification criteria.

32. A method of facilitating contact between consumers and service providers by providing a central clearinghouse of service provider performance information that offers insights into at least one of service provider qualifications, service provide reliability and service provider quality of workmanship, said central clearinghouse being easily accessible by consumers, said method being performed at least in part by a computer operated by a third party online listing service, said method comprising:

maintaining listings of service providers in a database;

imposing minimum mandatory predetermined non-fee based qualification criteria specified by said online listing service for service provider listings so as to make them qualified and acceptable for at least one of initial listing and continued listing and to be made available to consumers;

allowing consumers to remotely access and search said qualified service provider listings online over a data communications network;

presenting information concerning listed service providers in response to searches said consumers perform to search for and display qualified listings, automatically continually monitoring service provider qualification information and continually determining whether said service providers are qualified for continued listing, and further including receiving recommendations from consumers for listing additional service providers in said database, and in response to received recommendations, automatically generating communications to said recommended service providers, said communications comprising invitations to apply for listing, said generating including at least one of (a) generating an electronic application form on a website and sending email with an invitation to complete said electronic application form, and (b) generating at least one application form and delivering said at least one form to said recommended service providers.

33. A method as in claim 32 further including using consumer-provided input to determine whether service providers have met said minimum mandatory predetermined non-fee based qualification criteria so as to make them qualified and acceptable for initial and/or continued listing is carried out continually at least in part by an automatic computer process.

34. A method as in claim 32 further including making available to consumers said minimum mandatory predetermined non-fee based qualification criteria specified by said online listing service for service provider listings and using consumer-provided input to determine whether service providers have met said minimum mandatory predetermined non-fee based qualification criteria.

35. The method of claim 32 further including automatically recognizing and providing notice to a service provider when qualification criteria for said service provider falls below said minimum mandatory predetermined non-fee based qualification criteria.

36. An online computer system operated by an online listing service providing a central clearinghouse of service provider performance information that offers insights into at least one of service provider qualifications, service provider reliability and service provider quality of workmanship, said central clearinghouse being easily accessible by consumers, said online computer system comprising:

a service provider database storing profile information for service providers;

a consumer database storing profile information for consumers having rights to access information stored within said service provider database;

a server and associated communication facility coupled to said service provider database and said consumer database; said server and associated communication facility configured for consumers to access over a digital network and retrieve via a web browser, information concerning said service providers within said service provider database that meet non-fee based predetermined minimum qualification criteria specified by said online listing service;

said computer system further including:

means for requiring and automatically using on a continual basis, said non-fee based predetermined minimum qualification criteria specified by said online listing service for service providers to become listed and remain listed and displayable to consumers, means for receiving recommendations from consumers for listing additional service providers in said database, and means responsive to a received recommendations for automatically generating communications to said recommended service provider, said communications comprising an invitation to apply for listing, said means for automatically generating including at least one of (a) means for generating an electronic application form on a website and sending email with an invitation to complete said electronic application form, and (b) means for generating at least one application form for delivery to said recommended service providers.

37. A computer system as in claim 36 wherein said service provider database lists service provider information including license credentials and insurance support with monitored expiration dates.

38. A computer system as in claim 36 wherein said service provider database includes current up-to-date experience ratings and references by consumers.

39. A computer system as in claim 36 wherein said service provider database includes consumer ratings as to at least one of satisfaction, dependability and quality of work performed.

40. A computer system as in claim 36 wherein said service provider database organizes service provider information by trade.

41. A computer system as in claim 36 wherein said service provider database stores service provider information organized by geographical location.

42. A computer system as in claim 36 wherein said service provider database stores service provider information organized by qualification categories including at least one of consumer experience ratings and consumer references.

43. The system of claim 36 further including means for automatic rescoring, monitoring and continually rescoring each service provider's eligibility to remain listed.

44. The system of claim 36 further including means for automatically actively addressing any service provider that has failed to continue to meet said minimum criteria.

45. The system of claim 36, further including means for automatically computing rating scores for said service providers.

46. The system of claim 36 wherein said means for automatically using consumer input includes means for automatically delisting service providers at least in part based on said consumer input.

47. The system of claim 36 wherein said requiring means includes:

means for requiring favorable consumer input to qualify service providers for listing, means for monitoring listed service provider qualifications on an ongoing basis, means for rating listed service providers based at least in part on consumer input; and means for selectively delisting at least some service providers at least in part in response to qualification information and/or said ratings.

48. A computer system as in claim 36 wherein said minimum qualification criteria includes a minimum required ratio of positive to negative consumer ratings, and wherein said means for requiring automatically provides notice to the service provider when said ratio falls below said minimum required ratio.

49. A computer system as in claim 36 wherein said service provider database stores service provider information organized by qualification categories including at least one of duration of business, meeting licensing requirements, and insurance coverage.

50. An online service provider recommender system that allows consumers to access digital information pertaining to a pool of service providers via web browsers and an electronic communications network, said online service provider recommender system comprising:

at least one database; and at least one computer coupled to said database and configured to provide a sequence of displayable pages linked to one another said displayable pages including:

a search page, said computer being configured to receive service provider search requests consumers input via said search page based on at least one of trade category, geographical location, and service provider name;

a listing display page that displays information about a selected service provider including at least one of trade, contact information, time in business, licensing information, insurance information, reported number of jobs, and consumer satisfaction rating, current suspension status and current de-listed status; and an experience rating page that displays categorized consumer satisfaction ratings, said at least one computer being further configured to receive consumer input including complaints and to report when listed service provider information is inaccurate, said at least one computer being further configured to determine, automatically and on a continual basis in response to said received consumer input, whether service providers are acceptable for at least one of listing and continued listing, based on meeting predetermined non-fee based qualification criteria, said at least one computer being further configured to receive recommendations from consumers for listing additional service providers in said database, and in response to a received recommendations, automatically generating communications to said recommended service providers, said communications comprising invitations to apply for listing, said at least one computer being configured to at least one of (a) generate an electronic application form on a website and sending email with an invitation to complete said electronic application form, and (b) generate at least one application form and delivering said at least one form to said recommended service provider.

51. The recommender system of claim 50 wherein said at least one computer comprises means for automatically processing a listing application, means for automatically initiating a reference request, and means for automatically monitoring scoring and addressing responses.

52. The recommender system of claim 50 further including automatic means for addressing said complaints and information inaccuracies with service providers, for automatically monitoring responses and for taking action including delisting selected service providers.

53. The recommender system of claim 50 wherein said at least one computer is configured to invite consumers to submit consumer satisfaction ratings.

54. The recommender system of claim 50 wherein said at least one computer is further configured to automatically de-list service providers at least in part based on consumer input.

55. The recommender system of claim 50 wherein said at least one computer is further configured to use said consumer input to determine whether to initially list service providers.

56. The recommender system of claim 50 further including a storage device storing instructions for execution by said computer, said instructions including:

instructions for requiring favorable consumer input to qualify service providers for listing;

instructions for monitoring listed service provider qualifications on an ongoing basis, instructions for rating listed service providers based at least in part on consumer input, and instructions for selectively delisting at least some service providers at least in part in response to qualification information and/or said ratings.

57. The recommender system of claim 50 further including means for automatically recognizing and providing notice to a service provider when qualification criteria for said service provider falls below said minimum mandatory predetermined non-fee based qualification criteria.

58. A service provider clearinghouse computer operated by a service provider clearinghouse, said clearinghouse computer being coupled to consumer computing appliances via a computer network, said clearinghouse computer including:

a service provider database that stores information pertaining to plural service providers;

at least one processor coupled to said database, said processor being configured to electronically search said service provider database, and to receive consumer input ratings pertaining to said service providers represented within said database, said processor being configured to determine service provider acceptability for continued listing based at least in part on said received consumer input, said processor being further configured to receive recommendations from consumers for listing additional service providers in said database, and in response to received recommendations, automatically generate communications to said recommended service providers, said communications comprising invitations to apply for listing, said processor being configured to at least one of (a) generate an electronic application form on a website and sending email with an invitation to complete said electronic application form, and (b) generate at least one application form and delivering said at least one form to said recommended service providers;

processor being further configured to automatically and continually reviews consumer provided ratings and references, and condition maintenance of service providers listing for display within said database in response to consumer ratings and references, said processor being configured to thereby determine continually whether said service providers meet minimum non-fee based predetermined qualification criteria specified by said clearinghouse for at least one of service provider listing and service provider continued listing.

59. The computer of claim 58 wherein said at least one processor is configured to automatically de-list service providers based at least in part on said consumer input.

60. The computer of claim 58 wherein said at least one processor is configured to determine, at least in part in response to consumer input, whether to initially list service providers.

61. The clearinghouse computer of claim 58 further including a storage device storing instructions for execution by said processor, said instructions including:

instructions for requiring favorable consumer input to qualify service providers for listing;

instructions for monitoring listed service provider qualifications on an ongoing basis, instructions for rating listed service providers based at least in part on consumer input, and instructions for selectively delisting at least some service providers at least in part in response to qualification information and/or said ratings.

62. The system of claim 58 wherein said processor is configured to automatically recognize and provides notice to a service provider when qualification criteria for said service provider falls below said minimum mandatory predetermined non-fee based qualification criteria.

63. A computer-based system operated by an online service for referring consumers to service providers, said system comprising:

a service provider database that stores information corresponding to plural service providers; and at least one processor coupled to said service provider database, said at least one processor being configured to present information within said service provider database to consumers and accepts consumer input for use in determining, based at least in part on predetermined minimum non-fee based qualification criteria specified by said online service, whether service providers are acceptable for at least one of listing and continued listing;

said at least one processor being further configured to determine whether service providers are acceptable for listing and continued listing, and, to condition, in response thereto, active access by said consumers to information corresponding to said plural service providers said at least one processor being further configured to automatically de-lists on a continual basis, service providers that fail to continue to maintain satisfactory required qualification criteria;

said at least one processor being further configured to receive recommendations from consumers for listing additional service providers in said database, and in response to received recommendations, to automatically generate communications to said recommended service providers, said communications comprising invitations to apply for listing, said at least one processor being configured to at least one of (a) generate an electronic application form on a website and sending email with an invitation to complete said electronic application form, and (b) generate at least one application form and deliver said at least one form to said recommended service providers.

64. A system as in claim 63 wherein said at least one processor is responsive to favorable consumer experience ratings for each of said plural service providers.

65. A system as in claim 63 wherein said at least one processor is configured to confirm credentials for each of said service providers within said service provider database, including a valid trade/service license required in an applicable jurisdiction.

66. A system as in claim 63 wherein said least one processor is configured to determine whether each of said service providers has insurance coverage.

67. A system as in claim 63 wherein said at least one processor is configured to provide a website that distributes pages including said information over the World Wide Web.

68. A system as in claim 63 further including a printer, coupled to said at least one processor, that prints out directories containing said information.

69. The system of claim 63 wherein said at least one processor is configured to determine whether qualified service providers have a minimum duration of business.

70. The system of claim 63 wherein said at least one processor is configured to automatically de-list service providers based at least in part on consumer input.

71. The system of claim 63 wherein said at least one processor is configured to determine, in response to said consumer input, whether said service providers are to be initially listed.

72. The system of claim 63 further including a storage device storing instructions for execution by said at least one processor, said instructions including:

instructions for requiring favorable consumer input to qualify service providers for listing;

instructions for monitoring listed service provider qualifications on an ongoing basis, instructions for rating listed service providers based at least in part on consumer input, and instructions for selectively delisting at least some service providers at least in part in response to qualification information and said ratings.

73. The system of claim 63 wherein said at least one processor is configured to automatically recognize and provide notice to a service provider when qualification criteria for said service provider falls below said minimum mandatory predetermined non-fee based qualification criteria.

74. A method of facilitating contact between consumers and service providers, comprising:

listing plural service providers in an online database accessible by consumers over a communication network, including requiring said service providers to provide initially and as required, qualification information, including at least one of the following, predetermined non-fee based qualification criteria in order to be qualified to be listed:

(a) confirmation that the service provider is licensed, (b) confirmation that the service provider has insurance coverage, (c) how much experience the service provider has, and (d) at least one consumer reference, and presenting information concerning said listed plural service providers, processing consumer search requests and providing information concerning a service provider's performance;

accepting qualification input and using said qualification input for determining, automatically and on a continual basis, service provider acceptability for at least one of listing and continued listing; and receiving recommendations from consumers for listing additional service providers in said database, and in response to received recommendations, automatically generating communications to said recommended service providers, said communications comprising invitations to apply for listing, said generating including at least one of (a) generating an electronic application form on a website and sending email with an invitation to complete said electronic application form, and (b) generating at least one application form and delivering said at least one form to said recommended service providers.

75. The method of claim 74 wherein the presenting step includes allowing consumers to report information bearing on a service provider's alleged qualifications.

76. The method of claim 74 wherein said accepting and using step includes automatically delisting service providers based at least in part on said consumer input.

77. The method of claim 74 wherein said accepting and using includes using said consumer input to determine whether to initially list service providers.

78. The method of claim 74 wherein said accepting step includes:
 requiring favorable consumer input to qualify service providers for listing;
 monitoring listed service provider qualifications on an ongoing basis, rating listed service providers based at least in part on consumer input,
and
 selectively delisting at least some service providers at least in part in response to qualification information and said ratings.

79. The method of claim 74 further including automatically recognizing and providing notice to a service provider when qualification criteria for said service provider falls below said minimum mandatory predetermined non-fee based qualification criteria.

80. A computer-assisted method of facilitating contact between consumers and service providers, comprising:
 maintaining a database including information pertaining to plural service providers;
 automatically requiring certain types of information including predetermined non-fee based qualification information from each of said service providers without independently verifying said received information;
 presenting information stored in said database for electronic access by consumers over an electronic network;
 automatically receiving consumer input;
 using said consumer input for service provider acceptability for at least one of listing and continued listing; and
 receiving recommendations from consumers for listing additional service providers in said database, and in response to a received recommendations, automatically generating communications to said recommended service providers, said communications comprising invitations to apply for listing, said generating including at least one of (a) generating an electronic application form on a website and sending email with an invitation to complete said electronic application form, and (b) generating at least one application form and delivering said at least one form to said recommended service providers; and
 suspending selected service providers due to receipt of an adverse indication based on consumer input.

81. A method as in claim 80 further including conditioning said presenting step on the service provider suspension state.

82. The method of claim 80 wherein said automatically suspending comprises suspending selected service providers upon receipt of a subminimum consumer rating ratio.

83. The method of claim 80 wherein said automatically suspending includes automatically delisting service providers based at least in part on said consumer input.

84. The method of claim 80 further including using said consumer input to determine whether to initially list service providers.

85. The method of claim 80 wherein said using step includes:
 requiring favorable consumer input to qualify service providers for listing;
 monitoring listed service provider qualifications on an ongoing basis;
 rating listed service providers based at least in part on consumer input, and
 selectively delisting at least some service providers at least in part in response to qualification information and said ratings.

86. The method of claim 80 wherein said adverse indication includes unlawful or treacherous business acts.

87. A method as in claim 80 further comprising automatically requesting at least one of further information and verification from service providers regarding adverse indication that caused suspension.

88. The method of claim 80 further including automatically recognizing and providing notice to a service provider when qualification criteria for said service provider falls below said minimum mandatory predetermined non-fee based qualification criteria.

89. The method of facilitating contact between consumers and service providers by providing a central clearinghouse of service provider performance information that offers insights into at least one of service provider qualifications, service provider reliability and service provider quality of workmanship, said central clearinghouse being easily accessible by consumers, said method being performed at least in part by a computer operated by a third party online listing service, said method comprising:
 maintaining listings of service providers in a database;
 imposing minimum mandatory predetermined non-fee based qualification criteria specified by said online listing service for service provider listings to be made available to consumers to determine whether service providers have met said minimum mandatory predetermined non-fee based qualification criteria so as to make them qualified and acceptable for listing;
 allowing consumers to remotely access and search said qualified service provider listings online over a data communications network; and
 presenting information concerning listed service providers in response to searches said consumers perform to search for and display qualified listings,
wherein:
 said imposing step includes requiring consumer input to qualify service providers for at least one of listing and continued listing;
 said method further includes automatically and continually monitoring listed service provider qualifications on an ongoing basis, rating listed service providers based at least in part on consumer input, and selectively delisting at least some service providers at least in part in response to at least one of qualification information and said ratings; and said method further includes receiving recommendations from consumers for listing additional service providers in said database, and in response to received recommendations, automatically generating communications to said recommended service providers, said communication comprising invitations to apply for listing, said generating including at least one of (a) generating an electronic application form on a website and sending email with an invitation to complete said electronic application form, and (b) generating at least one application form and delivering said at least one form to said recommended service providers.

90. The method of claim 89 further including automatically recognizing and providing notice to a service provider when qualification criteria for said service provider falls below said minimum mandatory predetermined non-fee based qualification criteria.

* * * * *